United States Patent [19]

Ackeret

[11] Patent Number: 4,777,748
[45] Date of Patent: Oct. 18, 1988

[54] DEVICE FOR THE CYCLIC REARRANGEMENT OF A PILE OF RECTANGULAR OR SQUARE SHEETS

[75] Inventor: Peter Ackeret, Kusnacht, Switzerland

[73] Assignee: Licinvest AG, Chur, Switzerland

[21] Appl. No.: 888,332

[22] PCT Filed: Nov. 12, 1985

[86] PCT No.: PCT/EP85/00608
§ 371 Date: Jul. 11, 1986
§ 102(e) Date: Jul. 11, 1986

[87] PCT Pub. No.: WO86/03022
PCT Pub. Date: May 22, 1986

[30] Foreign Application Priority Data

Nov. 13, 1984 [DE] Fed. Rep. of Germany ....... 3441489

[51] Int. Cl.⁴ ............................................. G09F 11/30
[52] U.S. Cl. ......................................... 40/513; 40/511
[58] Field of Search .................. 40/10 R, 152.1, 489, 40/490, 491, 513, 508, 511

[56] References Cited

U.S. PATENT DOCUMENTS 4,238,898 12/1980 Ackeret ................................ 40/513
4,241,529 12/1980 Baur ..................................... 40/513
4,259,802 4/1981 Ackeret ................................ 40/513

FOREIGN PATENT DOCUMENTS 2403585 4/1979 France .
2403207 4/1979 France .

Primary Examiner—Gene Mancene
Assistant Examiner—J. Hakomaki
Attorney, Agent, or Firm—Robert R. Jackson

[57] ABSTRACT

A device for cyclically rearranging a pile of rectangular or square sheets (such as photographic prints) by repeatedly performing the operation of removing one sheet from one end of the pile and returning the removed sheet to the other end of the pile. To facilitate removal of each sheet from the pile, the sheet to be removed is pressed against a frictional surface by a roller on the separator structure which moves relative to the sheet to be removed in order to separate that sheet from the remainder of the pile. The frictional surface moves with the sheet to be removed, and the roller helps ensure that the sheet to be removed stays in contact with the frictional surface and is moved thereby.

50 Claims, 33 Drawing Sheets

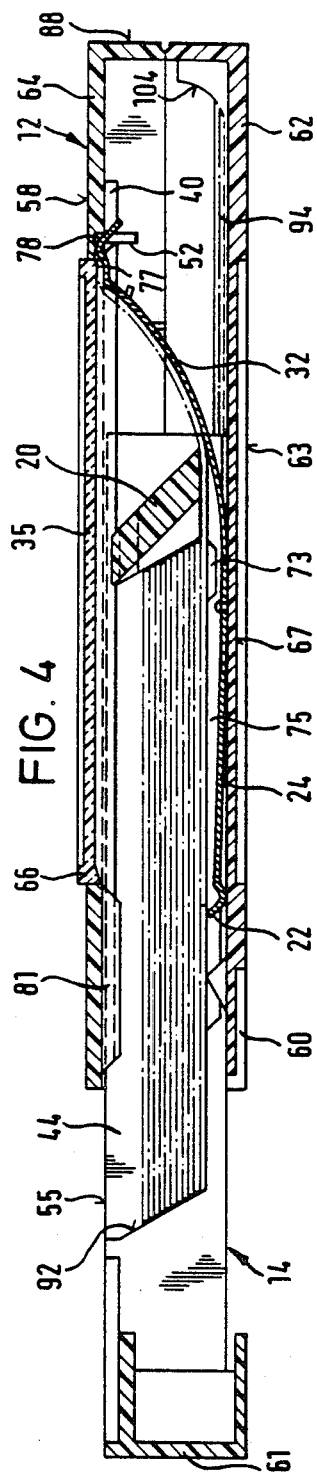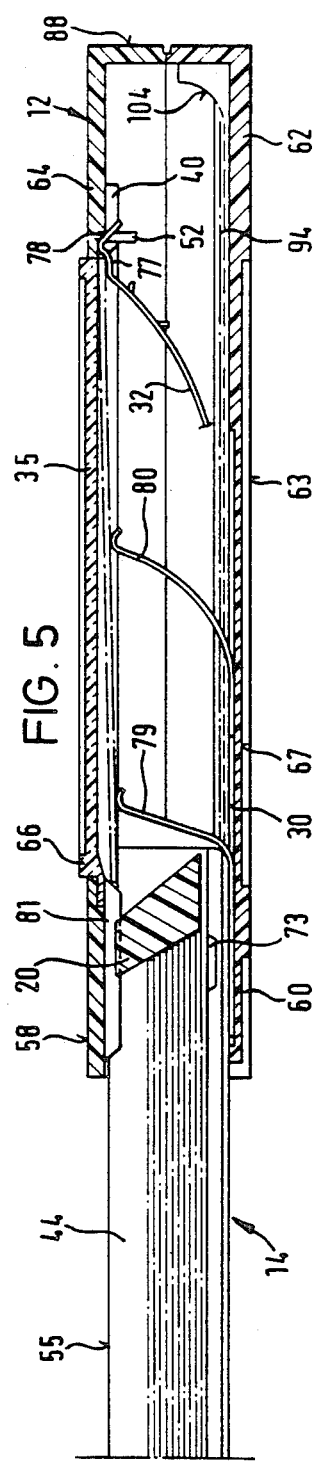

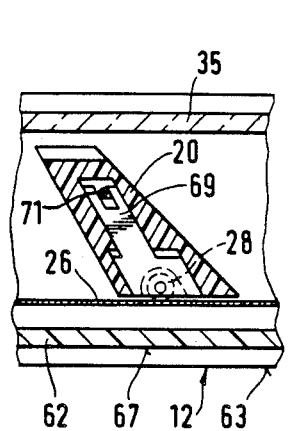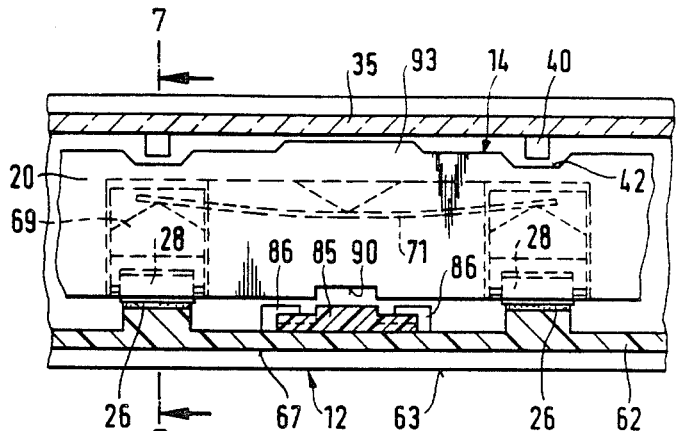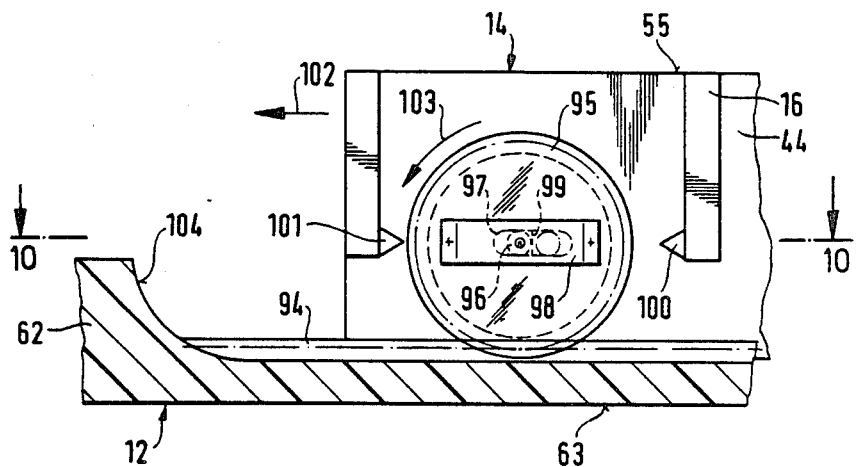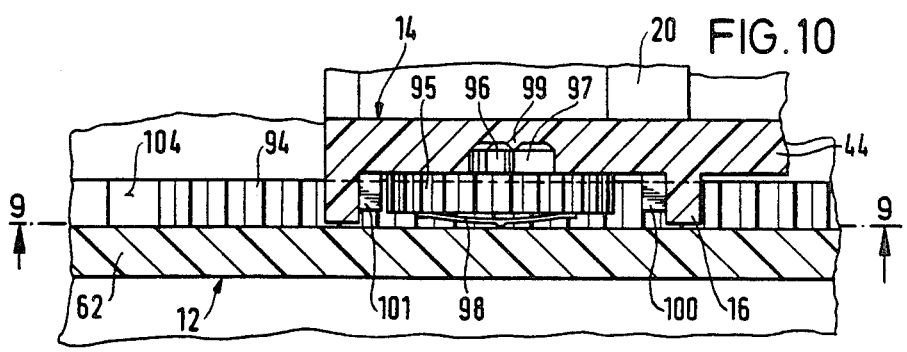

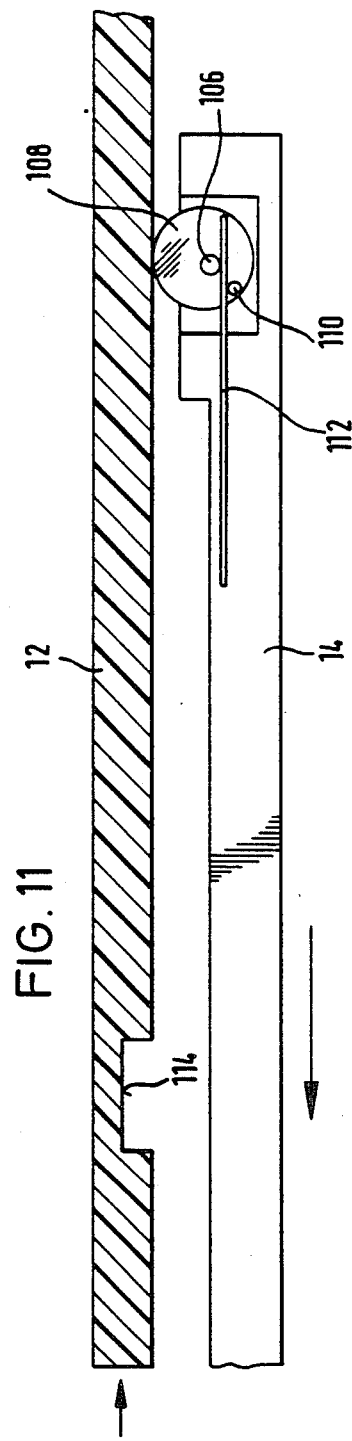
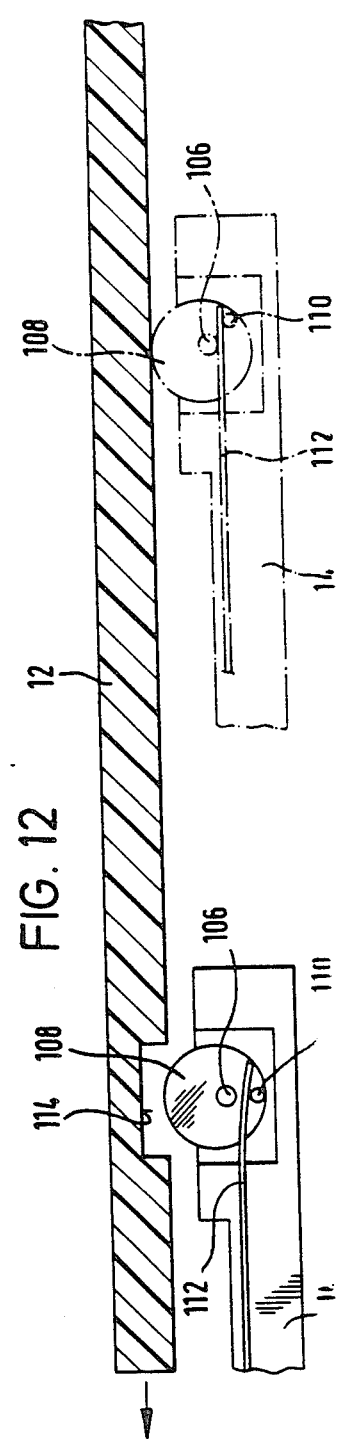

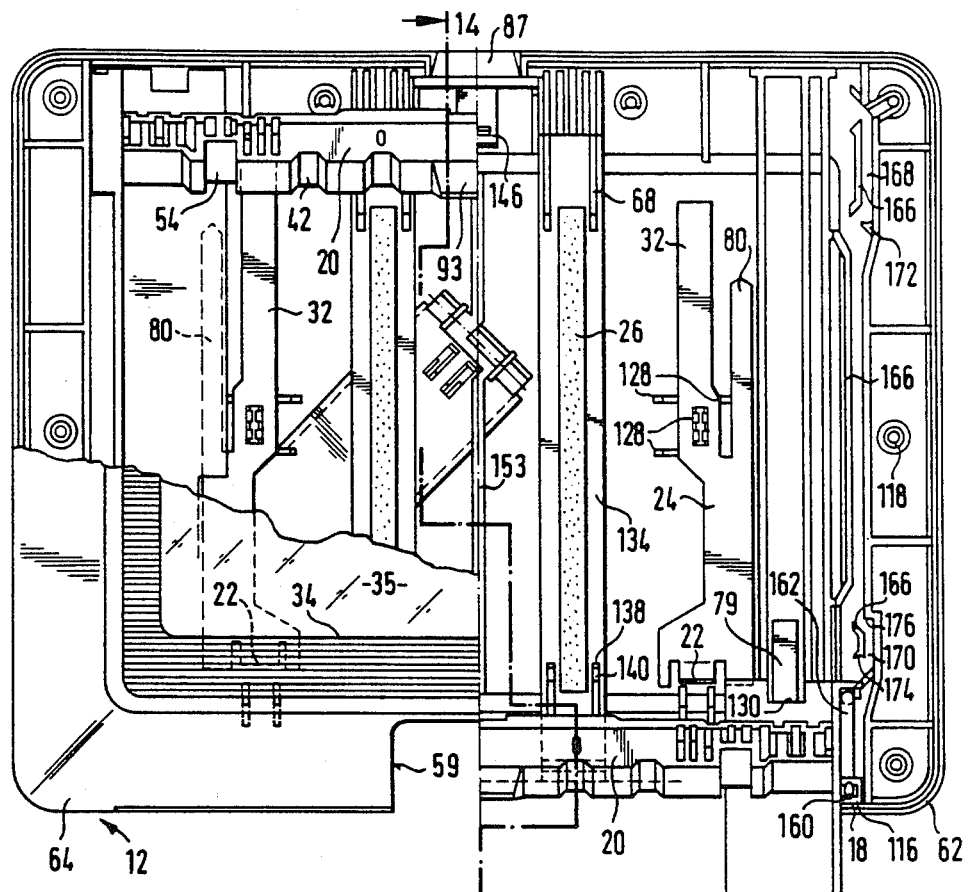
FIG. 13
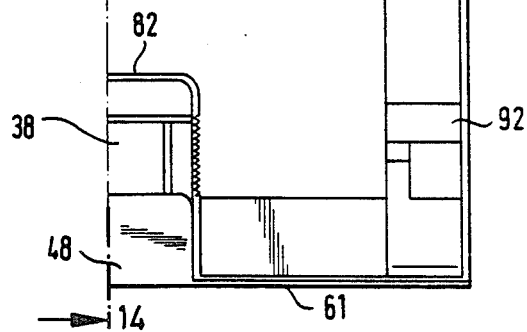

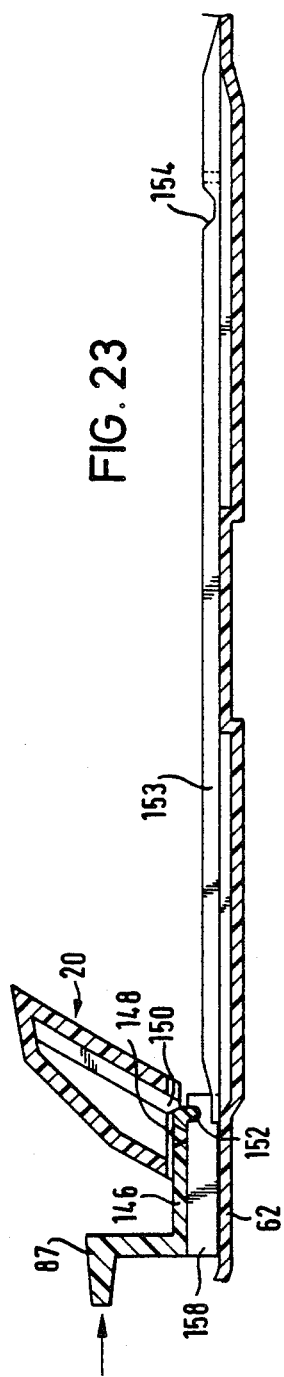
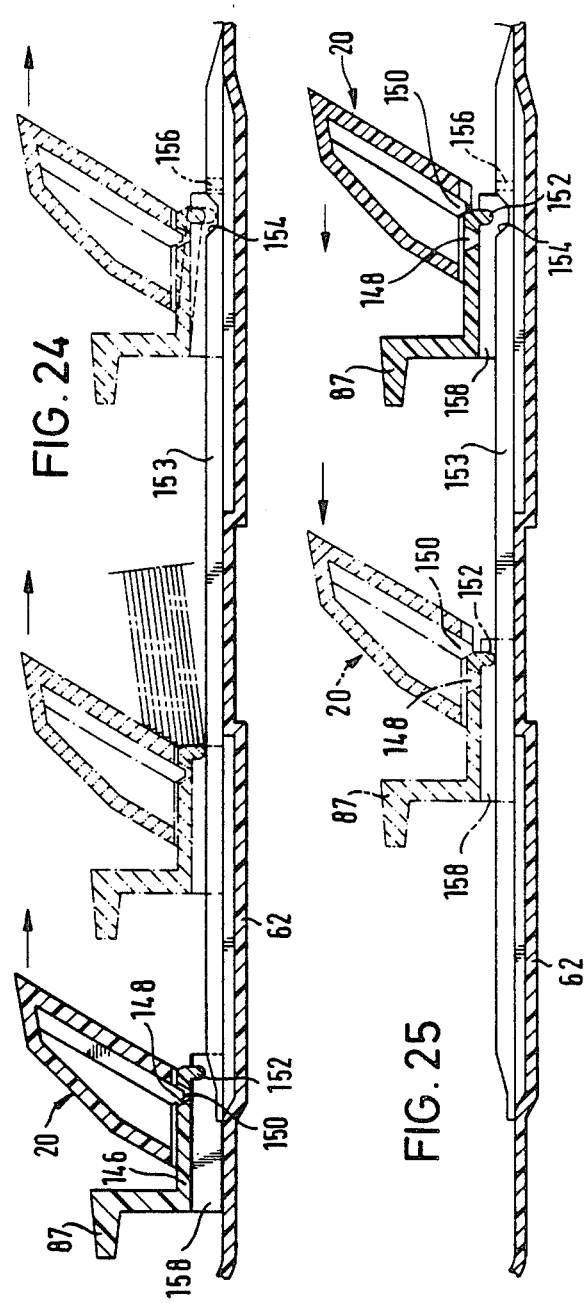
FIG. 23
FIG. 24
FIG. 25

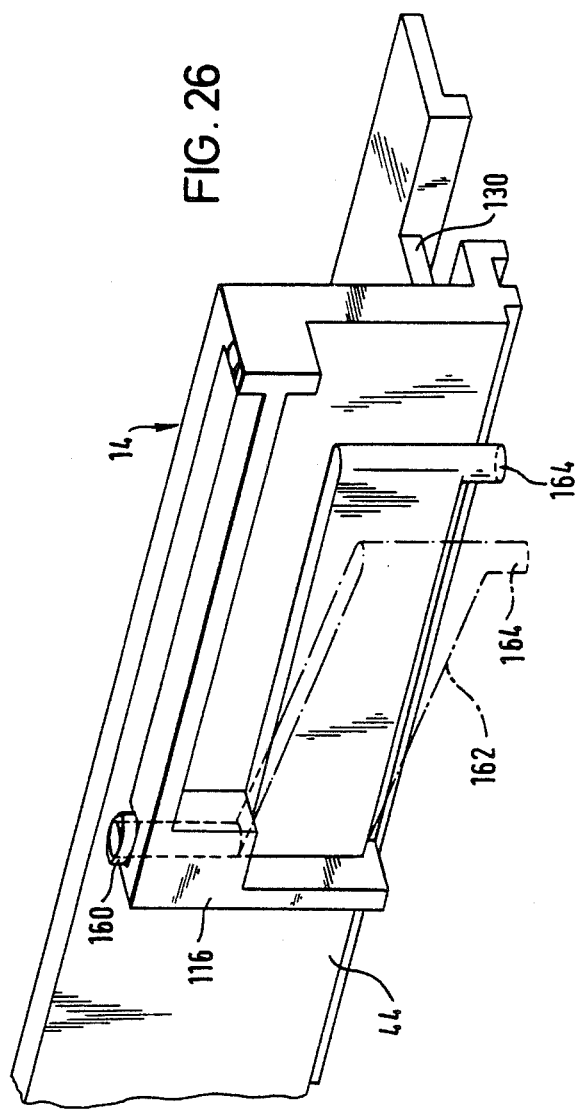
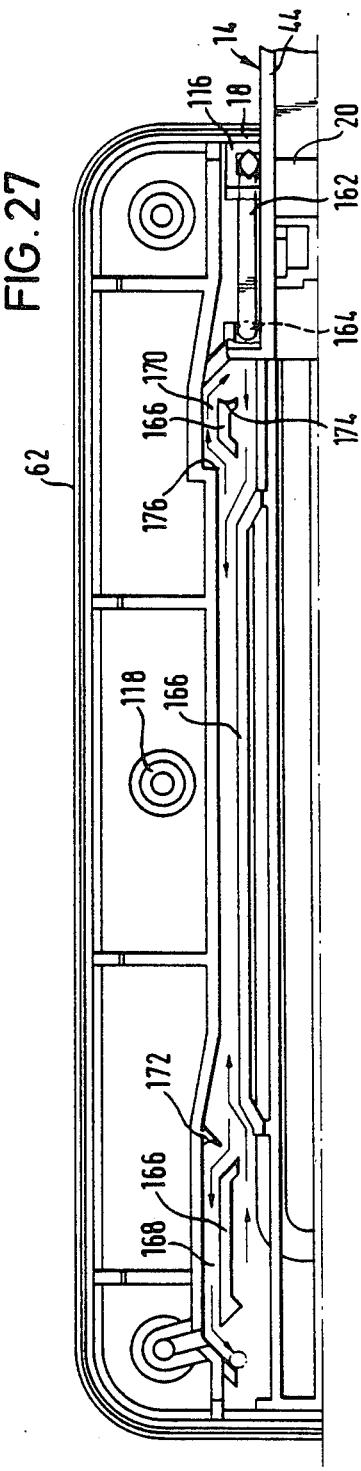

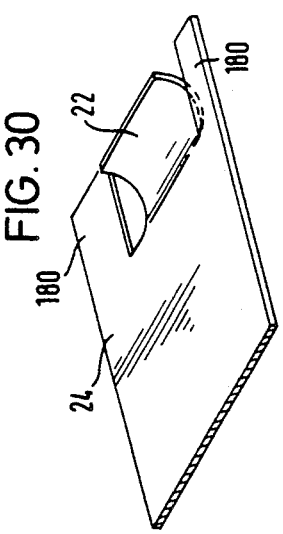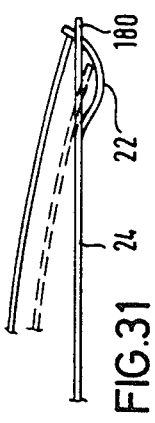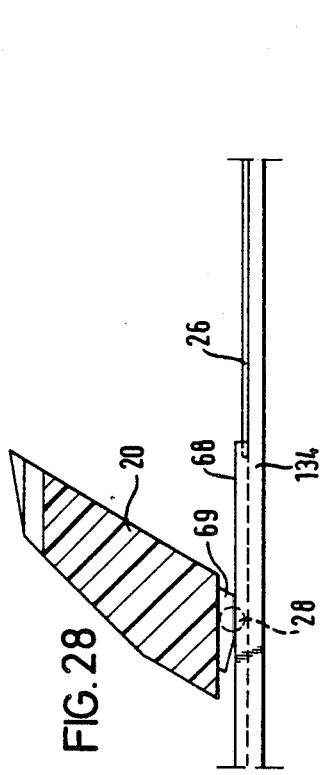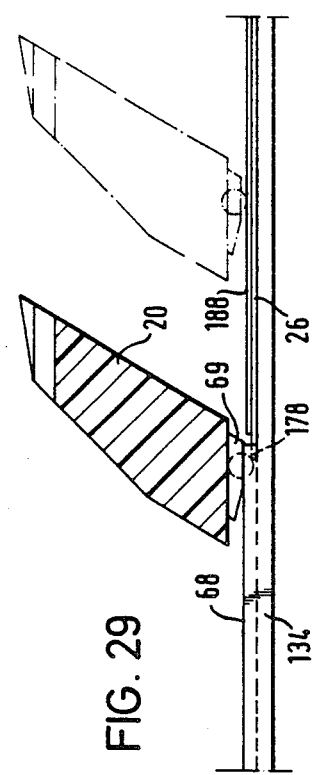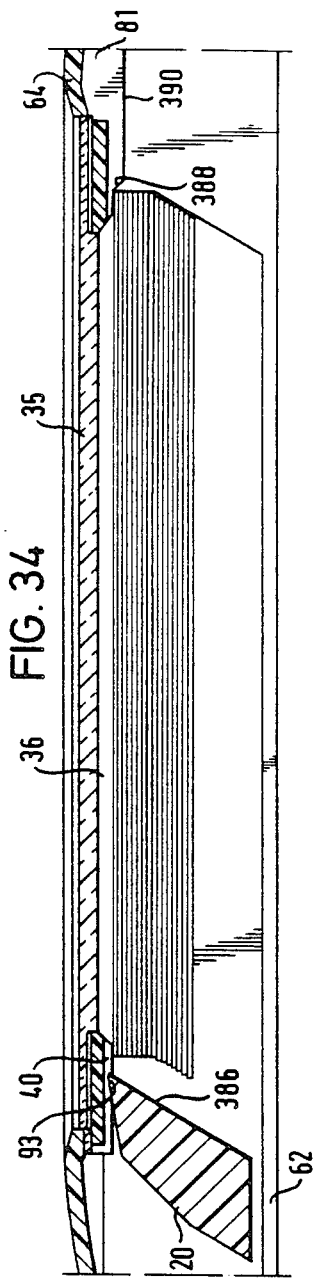

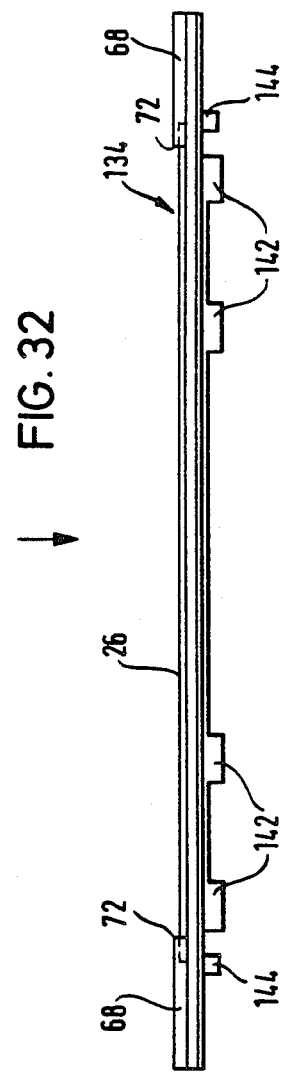

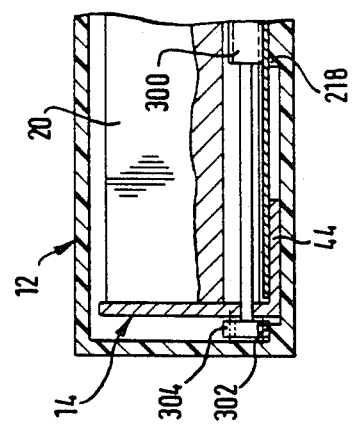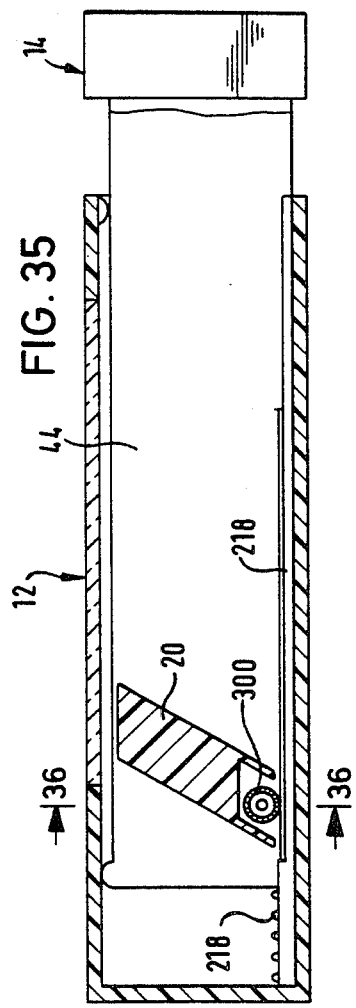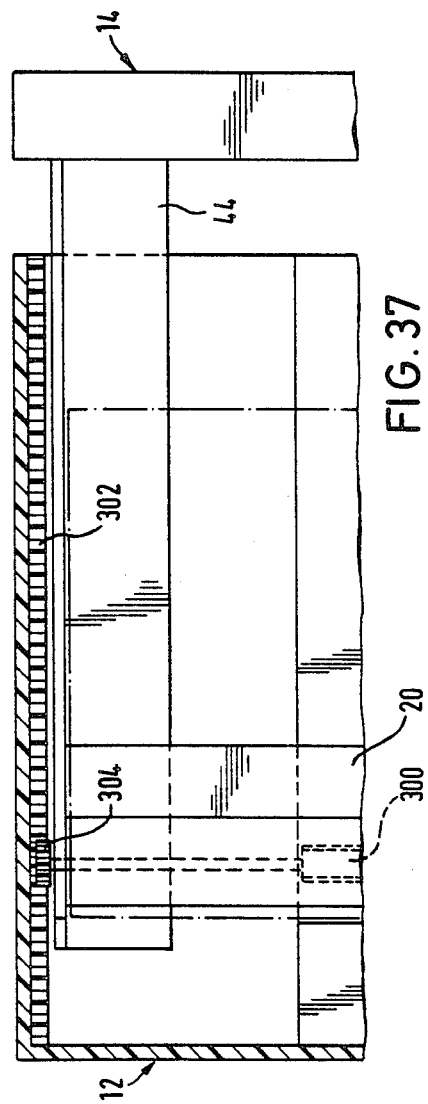

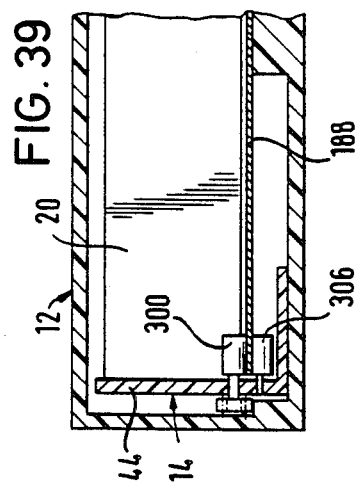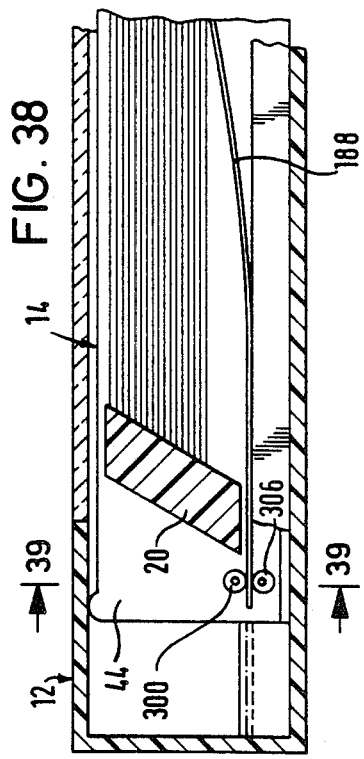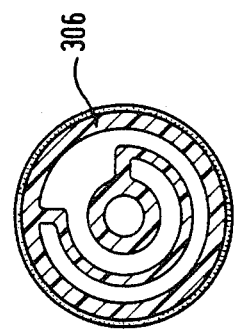

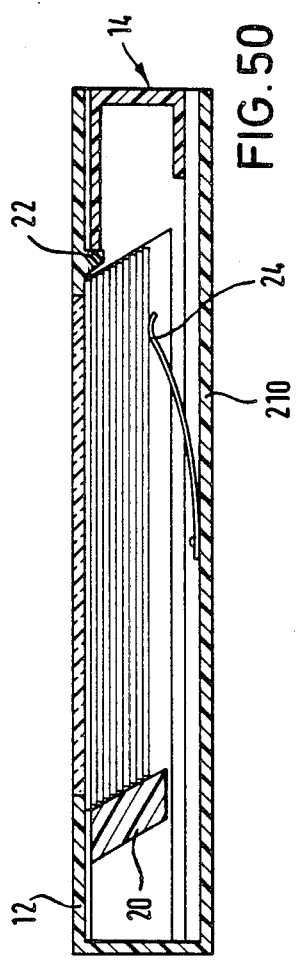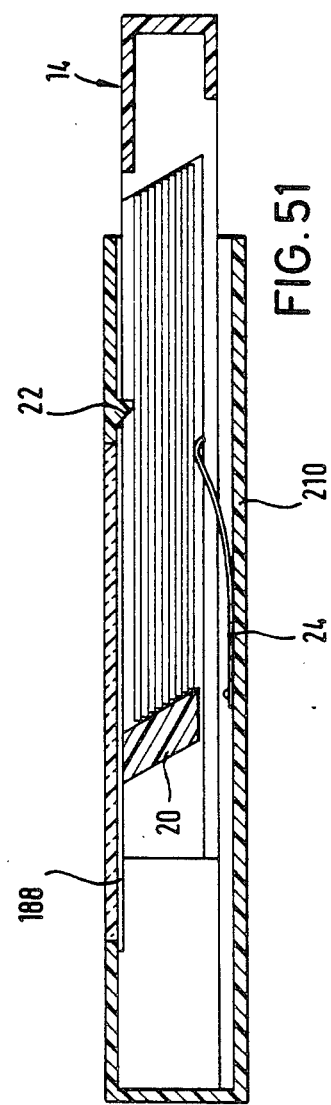

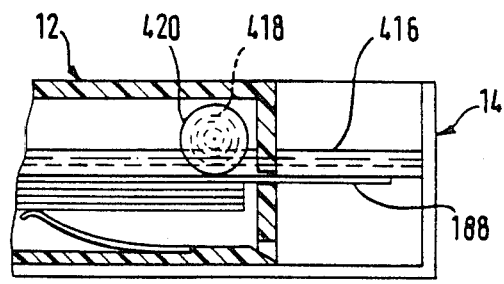
FIG. 55
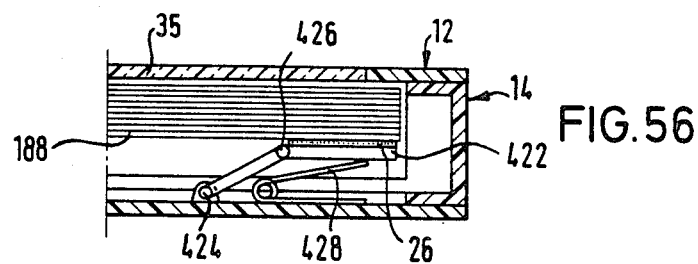
FIG. 56
FIG. 57
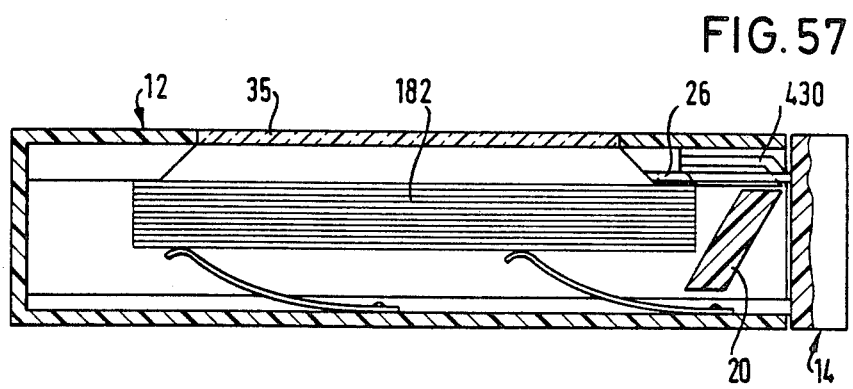

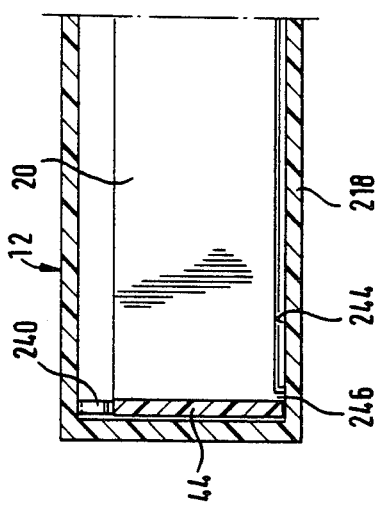
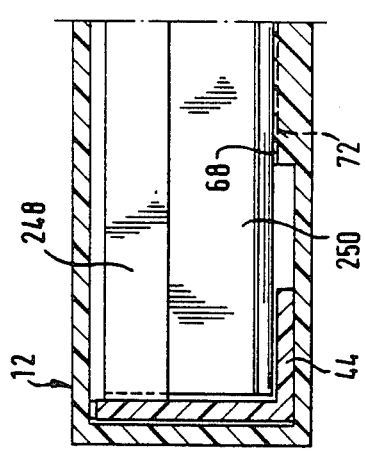
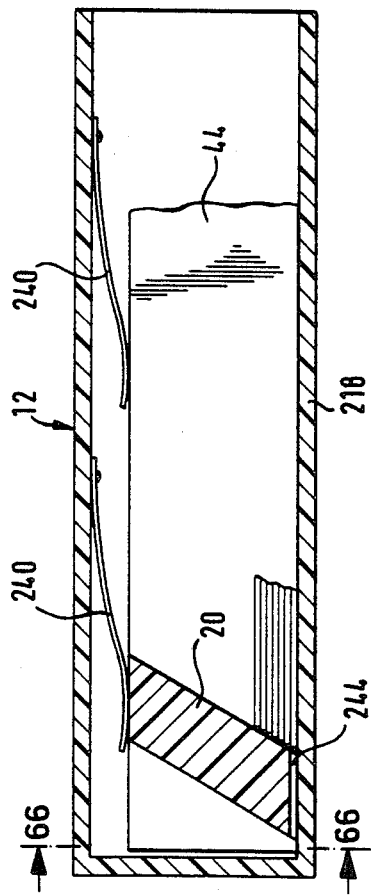
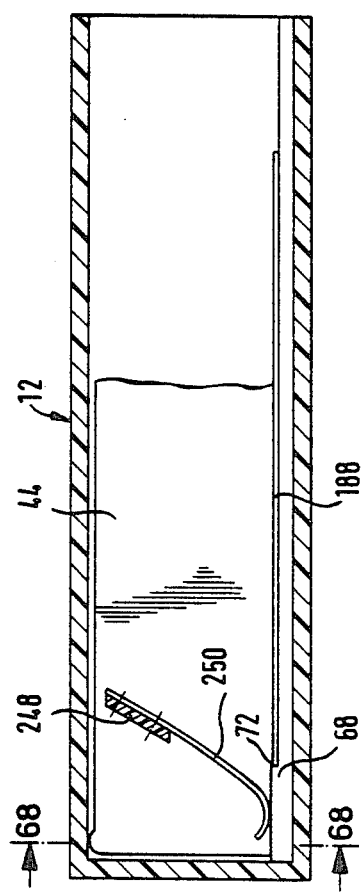

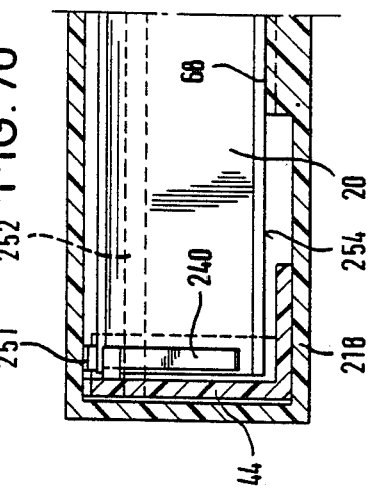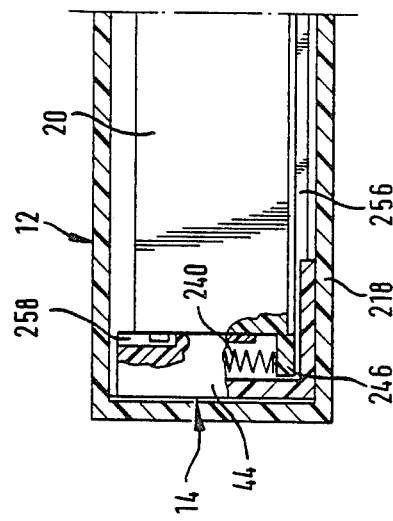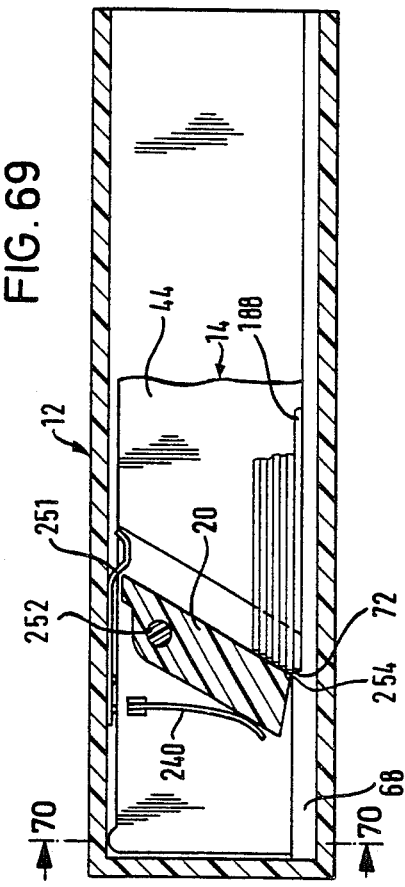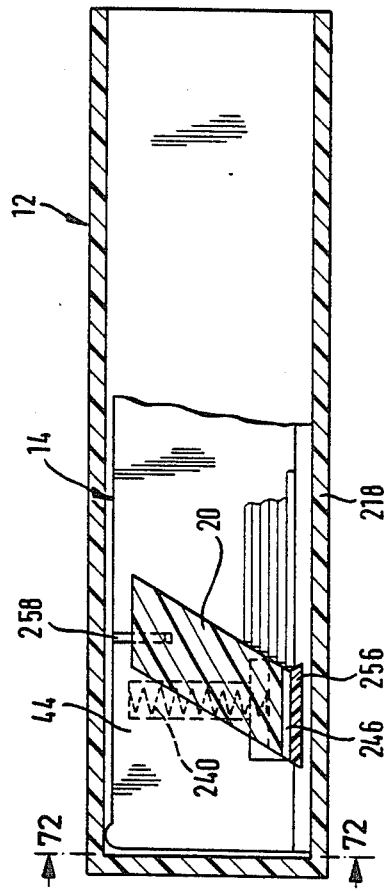

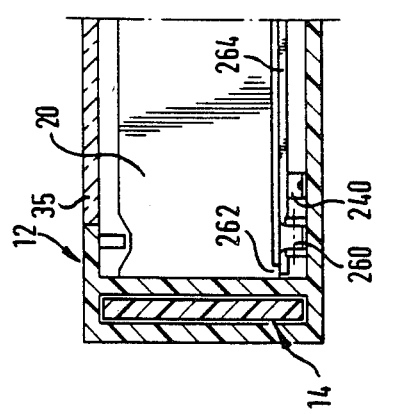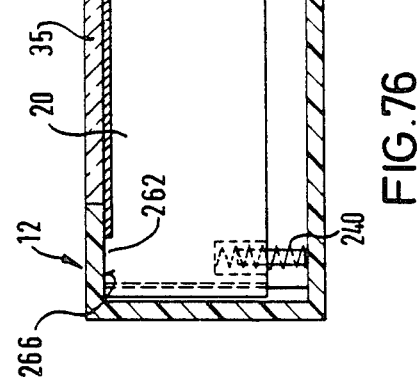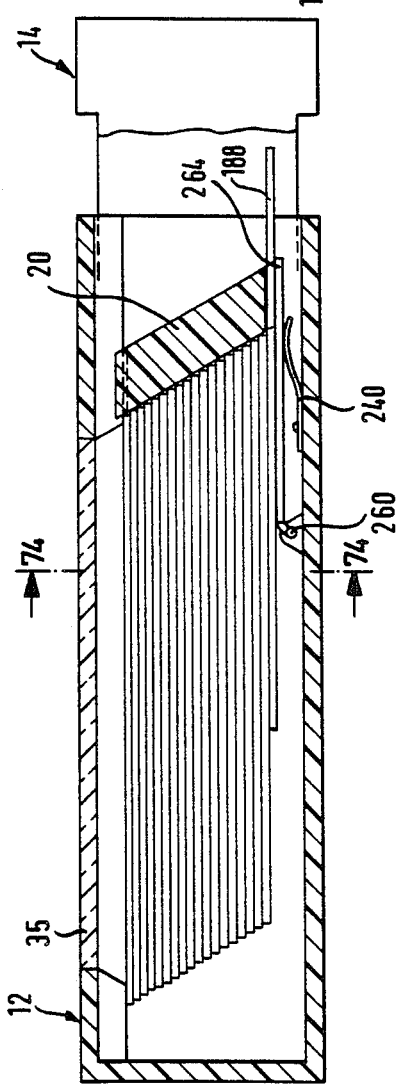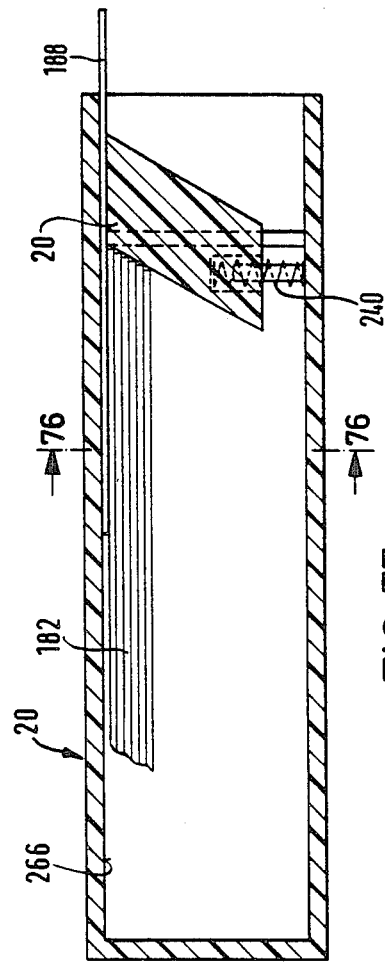

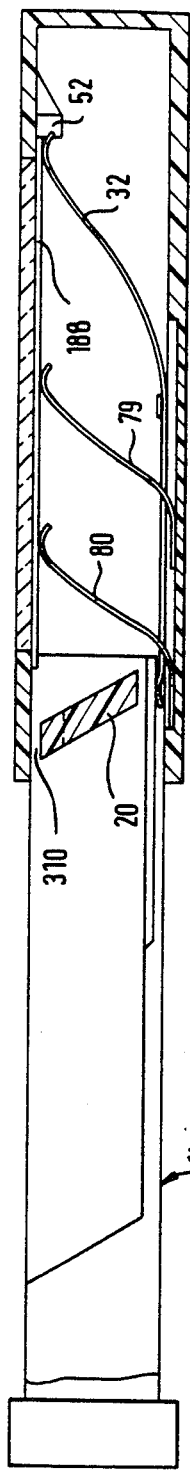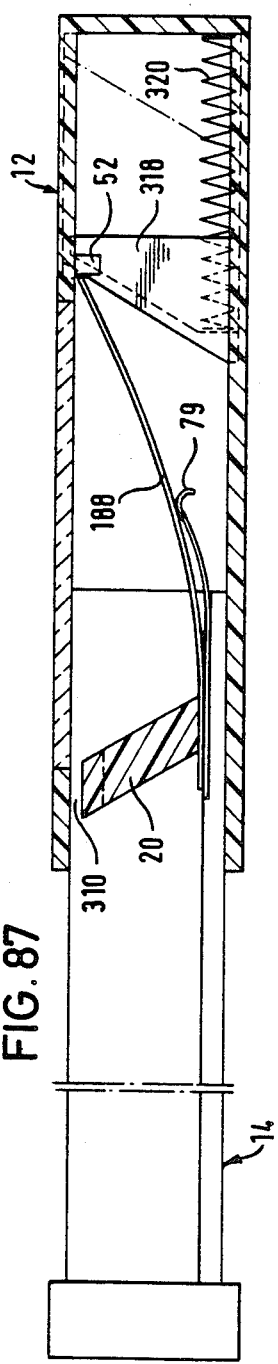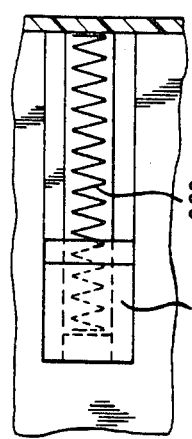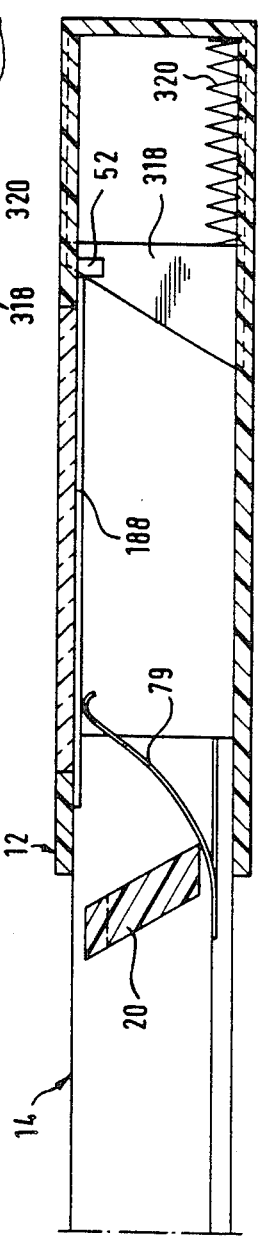
FIG. 86
FIG. 87
FIG. 88
FIG. 89

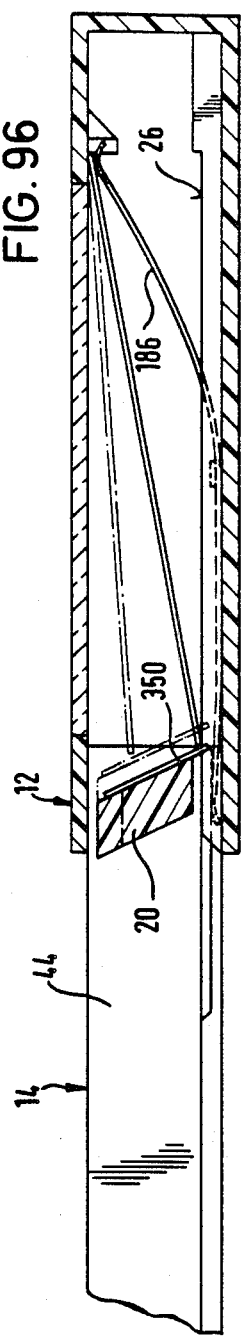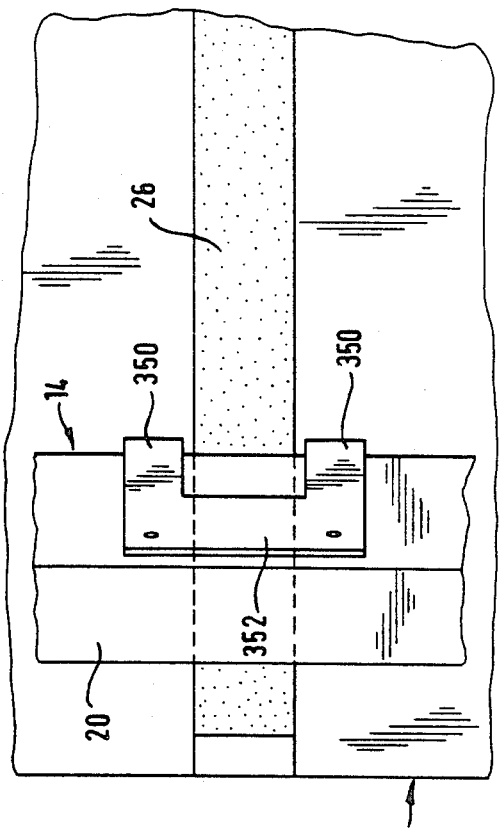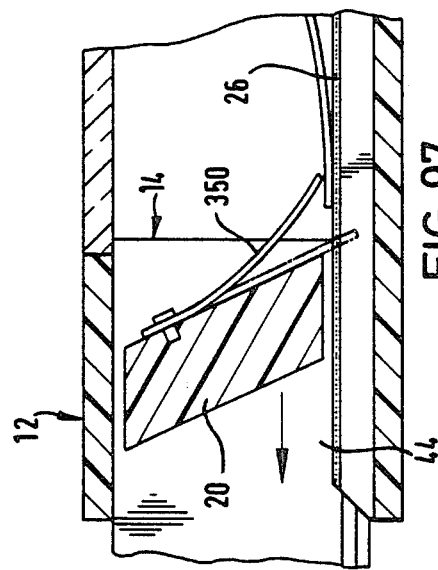

DEVICE FOR THE CYCLIC REARRANGEMENT OF A PILE OF RECTANGULAR OR SQUARE SHEETS

The invention relates to a device for the cyclic rearrangement of a pile of rectangular or square sheets, or a so-called "picture-changer".

Picture changers are known from U.S. Pat. Nos. 4238898, 4238899, 4241528, 4241529, 4245417, 4259802 and 4376348. These specifications are all based on the principle that a pile of pictures, especially photographic prints, is held by two frame parts that are movable relative to one another, one of which may have a viewing window. During each complete cycle of movement of the frame parts, that is, pulling them fully away from each other and sliding them fully back together again, one picture is removed from one end of the pile and returned to the other end of the pile again. The picture changers have the following components for this:

A feeding means feeds pictures to a separating means; the separating means detaches an individual picture from the pile; a retaining means holds the individual picture separated from the pile in one of the frame parts whilst the remainder of the pile is held in the other frame part; a guide means guides the separated individual picture such that it goes onto the other end of the remainder of the pile.

Here and hereinafter such devices are also referred to as "sheet changers" or "picture changers" and the term "sheet" and "picture" are likewise used synonymously.

The picture changers known from the abovementioned publications use one and the same element for the feeding means and retaining means, which secures the individual sheet in the first frame part. Since, however, the functions of these two devices are different, it is preferable for separate elements to be used.

It is the aim of the present invention to produce a picture changer having a design that is especially well adapted to the functions of the individual sheet retaining means.

According to the invention, a device for the cyclic rearrangement of a pile of rectangular or square sheets, especially a pile of photographic prints, is provided with a first and a second frame part which may be moved relative to one another and parallel to the main plane of the pile, and with means that, on movement of the frame parts backwards and forwards, remove an individual sheet from one end of the pile and add it to the other end of the pile again, these means comprising:

(a) a separating means for separating the individual sheet from the pile, (b) a feeding means for feeding sheets to the separating means, (c) retaining means for holding the individual sheet in the first frame part and the remainder of the pile in the other frame part, and (d) a guide means for guiding the separated individual sheet for the purpose of returning it to the other end of the remainder of the pile, wherein the retaining means for holding the individual sheet comprises:

(1) a roller which is arranged on the second frame part and which rolls, on the individual sheet which is to be held firm, at a peripheral speed which is equal to the relative speed between the two frame parts, and (2) a support member on the side of the individual sheet remote from the roller which is either a complementary roller arranged on the second frame part or a rail complementary to the roller provided on the first frame part, and wherein the roller and the complementary member hold the individual sheet by means of a pressure arrangement.

This solution has the following advantages:

The separating means in principle comprises an element defining a gap, relative to which element the individual sheet, together with the first frame part, is to be moved. The roller, which is also arranged on the second frame part, may then be structurally combined with this so-called "separator" and therefore requires only a small amount of space. The construction according to the invention means that there is no longer any need for any of the components to "cross" the path of the separator, and the retaining means is, for example when engaging the edges of the individual sheet, superior to other retaining means of different construction because it provides better protection for the thin photographic prints. For all that, a considerable retaining force is achieved, regardless of whether the photographic prints are warped or bowed as a result of environmental influences.

Embodiments of the subject of the invention are explained in detail below with reference to the accompanying drawings.

FIGS. 1 to 12 show a first complete embodiment and FIGS. 13 to 34 show a second complete embodiment, both being explained in detail.

The Figures that then follow are for the most part largely schematic or illustrate only details; the reader can refer to the embodiments which have been described in their entirety for the remaining features, or, alternatively, to the publications mentioned in the introduction. Likewise, the type of view (longitudinal section or cross-section, partial perspective, plan view etc.) will either be obvious to the person skilled in the art, or is specified in the description of each Figure.

FIGS. 34 to 41 illustrate different designs of the concept according to the invention of the retaining means. FIGS. 42 to 60 show feeding means that are compatible with or may be combined with these retaining means. Corresponding separating means are shown in FIGS. 61 to 76. The principle of the so-called length compensation is illustrated in FIGS. 77 to 81. FIGS. 82 to 98 show details and alternative designs of the guide means and FIGS. 99 to 105 illustrate different concepts of the so-called removal of the whole pile.

FIG. 1 shows in a plan view, partially cut away, a device according to the invention. The first frame part is designed as a housing 12, the second frame part is a slider member 14 which can be pulled out of the housing for a distance limited by stop members 16 on the slider member and complementary stop members 18 on the housing and pushed back in again. The separating means is formed by a separator bar 20. The feeding means is embodied by hook-like members 22 which are located on leaf-spring type spring arms 24. The retaining means for holding the remainder of the pile in the slider member is likewise formed by the separator bar, whilst the separated individual picture is held in the housing by the co-operation of rails, arranged fixedly in the housing and provided with a retentive coating 26, with rollers 28 that hold the individual picture firmly against the rails and are caused to rotate as a result of contact with the rails. Finally, the guide means is embodied by pairs of leaf springs 30 and spring arms 32, the spring arms 32 being formed integrally with the spring arms 24.

In the inserted state of the slider member 14, the spring arms 24 and 32 press the pile of sheets (not shown in FIG. 1) against a viewing window, the inner border of which is denoted by 34. The sheet which is then uppermost in the pile, in a specific case a photographic print, is intended to lie as flat as possible; to that end, at its periphery it is supported in a plane that is defined by lateral ribs 36, by the underside of a slidable catch 38 and, at the opposite end, by ribs 40 moulded on the housing.

FIG. 1 shows the partially withdrawn position of the slider member 14. In the inserted state, the separator bar lies on the other side of these ribs 40; however, because it projects further towards the window 35 which corresponds to the height of these ribs, it has recesses 42 so that the ribs are able to pass through.

The edges of the pile are supported laterally, (that is, parallel to the withdrawal direction) by side pieces 44 of the slider member. At the front, that is, on the side of the slider member that is furthest away from the housing when the slider member is withdrawn, the edges are supported by the stop face 46 of a centrally arranged grip part 48 that the user may grip and by lateral stop faces 50 on the slider member. At the opposite end, the edges of the photographs are supported against stop members 52 moulded on the housing, for the passage of which the separator bar likewise has recesses 54 that are substantially deeper than those for the ribs 40.

The rib 36 extends further into the interior of the slider member than the height that is defined by the top edge 55 of the side pieces of the slider member so that the photographs are unable to slide out laterally over the side pieces of the slider member. An analogous action occurs between the separator bar on the one hand, the ribs 40 on the other.

The grip part 48 has a top part 56 arranged on the window side of the housing, and a bottom part 57 which is wider than the top part; the top wall 58 of the housing surrounding the window in the manner of a frame has a cut-out 59 in the region of the top part whilst the opposing housing wall is recessed at 60 in a complementary manner for the bottom part 57. Accordingly, in its closed state the device has a closed, substantially rectangular outline without any protruding parts.

The housing and the slider member are injection-moulded plastics parts. The slider member is a one-piece element, comprising side-pieces, separator bar, grip part and a front wall 61 joining the grip part to the side pieces, which are of L-shaped cross-section.

The housing is composed of three parts: the bottom shell 62 providing the floor 63, the frame-like upper shell 64 with the window aperture, and the window 35 set into this. The housing is reinforced in the direction of the slider member movement in that the struts between the top and bottom wall are constructed as double supports, as shown in FIG. 6. The housing parts can be welded together, or a snap-fit connection may be provided.

Around its main surface the window has a narrow border 66 that protrudes slightly outwards, so that it is somewhat proud in respect of the frame surrounding it. A recess that is complementary with the outline of this border on the outside of the opposite bottom wall is denoted by the numeral 67 and permits several housings to be stacked one on top of the other.

When the slider member is withdrawn from the housing, it is gripped using one hand at the top and bottom parts of the grip part, whilst the other hand holds the housing. The hook-like members 22 engage the front edges of the photographs lying on the spring arm ends, that is the edges furthest away from the separator bar, as a result of which a certain number of photographs, depending on the height of the hook-like members, is fed to the separating means. This is basically formed as a through-slot which is defined, firstly by (in the embodiment) two lands 68 moulded on the base of the housing on the inside and, secondly, by the underside of shoes 69 that oppose the lands, the shoes being inserted into the separator bar and shown in FIG. 7 in section and in FIG. 8 in front view.

Each land 68 is associated with a respective shoe 69 and the land/shoe arrangements are located on both sides of the plane of symmetry 70 of the device. The shoes are guided longitudinally in the separator bar, are supported on a knife-edge-like bearing and biassed by an inserted wire spring 71. Each shoe additionally accommodates a small roller that is rotatable about an axis at right angles to the withdrawal direction and the small roller 28 projects slightly from the shoe.

FIG. 3 shows the position of the lands 68 which protrude by fully the thickness of a photographic print further above the level of the base of the housing than the surface of the retentive coating 26. In the rest or closed position of the slider member, the lowermost portion of the shoes is spaced somewhat from the edge 72 of the land, and the surface of the separator bar facing towards the pile is sloped, somewhat like a wedge, such that, as the separator runs onto the edge of the pile, the photographs, on the opposite edge of which the hook-like members 22 are acting, "migrate" downwards along the oblique face towards the edge 72 of the lands facing them. There is sufficient room between the shoes 69 and the retentive coating 26 for the leading edge of a single photograph alone (the lower-most in the pile) to be able to enter the slot forming between the shoes 69 and the retentive coatings 26, for as long as this slot is held open by the land 68 as will be explained. All the other photographs transported with the hook-like member 22 come up against the separator itself or against the shoes thereof with the result that the hook-like members slip off the end edge of the photographs.

When the rear edges (in the withdrawal direction) of the shoes 69 have passed the edge 72 of the lands 68, the shoes drop under the action of the wire spring 71, the rollers 28 positioning themselves on the individual photograph that has been separated in this manner and pressing it onto the associated retentive coatings so that it is firmly held in the housing, that is, the first frame part. The remainder of the pile is transported by the separator together with the slider member to the outside until the slider member has been fully withdrawn.

Care should be taken therein that the separator bar also runs over the spring arms 32. So that they do not stress the separated picture from below during the passage of their ends acting on the pile, during a certain phase of the withdrawal movement they are pressed mechanically towards the housing floor. Spring-depresser members 73 moulded on the slider member side pieces 44 are used for this purpose; these spring-depresser members pass over projections 74 extending laterally from the spring arms and hold the arms corresponding to their length for a part of the withdrawal movement. Further spring-depresser members 75 on the slider member side pieces run onto the spring arms 24 at the enlarged portion 76 as soon as the individual photograph has been safely held between the retentive coating and the rollers, and press these arms likewise away from the viewing window so that further photographs can be introduced and others removed without hindrance.

On the side of the separator furthest from the pile the spring arms 32 are released again after travelling a short distance so that they again act from beneath the separated photograph and guide its trailing edge gradually towards the window. Finally, this edge positions itself under the influence of the springs against the upper side of the housing. Because the free ends of the spring arms are rounded, but this edge shall on the other hand be firmly held at the position it has reached, a short portion of the spring arms is additionally of linear formation, denoted by 77 in FIG. 4. The rounded spring arm end finds space in a recess on the inside of the top wall of the housing, denoted by 78 in FIG. 5.

The two hook-like members 22, the two shoes 69, the retentive coatings 26 and the spring arms 32 are all in each case arranged symmetrically with respect to the central plane of the device as a whole, and the two hook-like members 22 lie as exactly as possible on a line that is at right angles to this plane of symmetry. This means that the photograph to be changed then goes through the change-over operation without becoming twisted even when it is not guided by the slider member side pieces because it has dimensions smaller than its nominal ones. The dimensional tolerances of photographs are in fact, with the same nominal size, different in the transverse and longitudinal direction: since the processing firms work with photographic paper from rolls of very accurately defined width and then cut the photographic paper up into different lengths, it is preferable to have the closer toleranced dimension of the photograph in a direction appropriate to that in which the slider member moves.

The complete separated individual picture, which until now has been described as being held only at its one edge, is lifted towards the window. For this, the leaf springs 30 already mentioned having forwardly-positioned arms 79 and rearwardly-positioned arms 80 are used, these arms holding and supporting the individual photograph, as seen clearly from FIG. 5, in such a manner that it is able to return to the pile again as the slider member is pushed back in. In the closed state of the device and during the withdrawal movement of the slider member, at least during the initial part thereof, the spring arms 79, 80 are pressed by the side pieces of the slider member into complementary grooves in the housing floor, which may be seen in FIG. 6.

At the start of the return movement of the slider member, the individual photograph is held by the spring arms 32 in front of the stop members 52 moulded on the housing and is supported in the direction of the separator bar at four points by the spring arms 79, 80. The other transverse edge of the photograph facing towards the separator bar may hang down; the side of the separator facing it is, however, sloped, somewhat like a wedge, so that the edge is raised gradually as the separator bar runs onto it. Between the top edge of the separator bar and the top wall of the housing there is a gap which is generously dimensioned for the passage of the photograph. The risk of the photograph striking against the edges facing it of the remainder of the pile transported by the slider member is countered by the top wall of the housing having holding-down lugs 81 on its inside which hold the pile below the level of the top side of the separator. These holding-down lugs are aligned with the ribs 40 so that they pass through the complementary recesses 42, 54 of the separator bar.

The slidable catch 38 is mounted so as to slide in the grip part and is biassed by a spring towards the housing, as readily recognisable from FIG. 3. As the slider member is inserted, the free edge 82 of the slidable catch strikes against a stop member 83 provided in the housing, as a result of which the slidable catch is pushed back into the grip part and does not project into the space visible through the housing window. Once the slider member has been pulled out, however, the slidable catch prevents the photographs lying in the slider member from falling out. To change the photographs, the slidable catch can be pushed back manually, which is facilitated by the finger-engageable edge 84. The photographs may be pushed out from the underside of the slider member by getting hold of them between the side pieces, or they may be grasped from above next to the grip part.

In the case of the procedure described so far, the separated photograph always remains behind in the housing. It is not possible, or only possible with difficulty, to remove this from the device. In order to be able to remove the pile even when this consists of one picture only, a special arrangement is therefore provided.

A control bar 85 is slideably mounted in the housing, held by retainers 86 moulded on the housing. The bar carries an actuating or control key 87 which passes through the rear wall 88 of the housing and projects slightly beyond the outline of the change-over device. By applying pressure with the finger to the key, the bar runs on wedge-like guide members 89 on the housing floor and is thereby lifted towards the window. The width of the bar fits exactly into a complementary recess 90 in the separator and blocks, for the entire withdrawal movement of the slider member, the throughslot of the separating means, so that every picture located in the device has to be transported out with the slider member. Close to the outer end position of the slider member, its separator bar runs over an upwardly-projecting part 91 of the bar which yields resiliently downwards; if the slider member is now pushed back in, the separator bar first pushes the bar back into its initial position, before it can be freely guided back with the upwardly-projecting part 91 being deflected again.

As mentioned above, the photographs are intended to be held by the means described at a distance from the window pane so that during the change-over operations it does not come into contact with the surface of the picture, causing scratch damage to occur. There is still this danger, however, because the photographs are not (always) flat, but generally speaking are bowed either in the longitudinal or in the transverse direction. In the case of bowing in the longitudinal direction, the ribs 36 effective for the entire withdrawal movement are sufficient. In the other case, however, the slideable catch is effective but the opposite portion of the separator bar would hardly be able to absorb the considerable stresses which occur in a relatively thick pile of similarly bowed photographs.

For this reason the following measures are taken in addition:

Beneath the stop faces 50 the front wall of the slider member therefore has, near the side pieces 44, inclined faces 92 which are substantially parallel to the separator slope lying opposite. The photographs thus lie so that they are staggered obliquely between separator and inclined faces, so that most of the stresses in the pile are distributed over the entire surface of the separator. In addition, in the centre of the separator bar a projection 93 is provided which takes up the residual stress of those photographs which are supported against the stop faces 50 perpendicular to its edge.

Once the user has begun to carry out the changeover movement, this must be completed in order to bring the device back into the initial position. The slider member cannot therefore be pulled out halfway and then pushed in again.

This is effected by means of a mechanism which is shown in detail in FIGS. 9 and 10. Moulded onto the housing there is a toothed rack 94 with which a pinion 95 meshes, the pinion being integrally-formed with its shaft 96. The shaft fits in a slot 97 running parallel to the rack in the side piece 44 of the slider member, in which slot it is pressed and held by means of a small leaf spring 98, moulded onto the pinion, and resting against the housing.

The slot 97 is divided by means of a rib 99 into two parts, in which the shaft 96 has only a little lateral play. Finally, moulded onto the slider member on both sides of the slot there are locking lugs 100, 101 which lie in the plane of the toothed circumference of the pinion and the points of the lugs are engageable with the latter.

This mechanism operates in the following manner:

Let it be assumed that the pinion is in the position shown in FIGS. 9 and that when the slider member moves in the direction of the arrow 102 the pinion rotates in the direction of the arrow 103. Owing to the friction of the small spring 98 on the housing wall the pinion is thereby held near the centre of the slot with its shaft resting against the rib 99. The result is a spacing, although this is small, between the circle defined by the tips of the teeth of the pinion and the point of the lug 101. If an attempt is now made to move the slider member in the opposite direction, the pinion is displaced to the outer end of the slot and its further movement immediately blocked by the point of the lug 101. At the end of the travel of the slider member, however, the toothed circumference of the pinion meets a stop sector 104 and, with the small spring 98 being deformed, is lifted over the rib 99, so that now rotation only in the opposite direction is enabled.

It is important to note that over the greater part of the withdrawal travel of the slider member the retaining means is indeed embodied by the rollers 28 in conjunction with the retentive coatings 26, but over the last part of the travel, shortly before the end position is reached, the spring arms 32, by firmly holding the individual photograph, also act as an "extension" of the retaining means.

As is apparent from the preceding explanation, each rearranged sheet is never released during the whole changeover cycle, but is held at at least two points and thus secured against rotation. It is thus constantly under control, in this case with means symmetrical to the axis.

The limbs of the slider member side pieces which are parallel to the pile and on which the separated sheet supports itself during rearrangement, should be at the most at such a distance from each other that a short photograph, which rests with one edge just against a limb of a side piece perpendicular thereto, is still held by the opposite side piece on the other edge.

As mentioned above, the device has the viewing window in the upper shell of the housing. The dimension of the window is then at the most so great in the direction transverse to the direction of movement that the shortest possible photograph, even if it is lying off-centre, does not present itself with its edge in the field of view. The same applies to the ribs 36, and just the same considerations apply to the spring arms 79 and 80 and especially to all components engaging with the sheet surfaces.

The construction of the spring system which is described above and illustrated, formed by the springs, cut in one piece and arranged symmetrically in pairs, with the spring arms 24 and 32, fulfils a total of five functions. Firstly, the hook-like members 22 moulded on them form the feeding means, the hook-like members finally taking along only one sheet into the separating means. Secondly, both arms together—or more accurately, the four arms of the two springs—form a bias system with which the pile is neatly pressed against the window when the device is at rest. Thirdly, the arm 32, after it has been passed over by the separator, serves to convey the individual sheet to the housing top wall and there, fourthly, hold it firmly. Fifthly, and finally, the arms 32 are arranged close enough to the retentive coatings 26 to be able, as a result of their bias force, to displace or peel off from the retentive coating any individual sheet which might adhere to the latter owing to a static charge. It is to be noted that the arm 32 is so shaped and arranged that it can be passed over by the separator bar without any disturbance to smooth operation.

FIGS. 11 and 12 show an alternative form of the blocking means according to FIGS. 9 and 10. Of the frame parts, in each case only sections 12 and 14 lying opposite each other are indicated. In one of the frame parts, in this case the frame part 14, a jamming-action roller 108 is rotatable about a journal 106, which is, however, fitted eccentrically. The roller carries opposite its greatest radius a pin 110 over which there is engaged a leaf spring 112 attached to the frame part 14. During movement in the direction of the arrow in FIG. 11 the jamming-action roller can yield, but in the opposite direction it jams the two frame parts. When the frame parts are in the end positions the jamming-action roller meets in each case a recess 114 in the other frame part and can therefore, when the push/pull direction is reversed, pivot freely through approximately 90°, until the pin 110 rests against the spring 112 again.

The two blocking devices described above act in the manner of a free-wheel and they only switch over the direction of free-wheeling when the two frame parts are in the end positions relative to each other. It may happen, however, that a user would like to rectify a faulty operation, perhaps because a pile of photographic prints has shifted during insertion. It is then desirable to be able to displace the frame parts relative to each other in both directions without blocking, at least from certain positions. For this reason a different type of construction of the blocking device is provided in the preferred example of execution described below.

In FIGS. 13 to 15, the embodiment is illustrated in its totality. The slider member 14 is housed in the housing 12 so that it can slide; the housing 12 forms the first frame part, and the slider member 14 the second. The withdrawal travel is limited by means of a bearing eye 116 which is moulded onto one of the side pieces 44 of the slider member and runs onto a stop member 18 in the housing. The housing is screwed together from an upper shell 64 and a bottom shell 62, the outer rims of which engage in an interlocking manner with each other, in the region between the side pieces 44 of the slider member and the outer edges of the housing which are parallel thereto. For this purpose, the bottom shell has in each case moulded-on guide sleeves 118 for screw shanks 120 and also recesses 122 on the outside for screw heads 124, while the upper shell carries for this purpose coaxially moulded-on bushings 126 in which the screws cut their own thread. The window 35 is clipped into the upper shell 64 and the parts of the upper shell lying beneath its outer border areas are not visible, owing to the fact that these areas of the window are frosted. In FIG. 13 the outline of the central transparent portion of the window is marked by 34.

With regard to operation, there are few differences compared with the example of execution according to FIGS. 1 to 10, so that it is sufficient to explain only the significant deviations.

In this case the spring arms 24, 32 and 80 are combined into a stamped and bent part, positioned by means of projections 128 and fixed by crimping without the application of heat. The spring arms 79, however, are separate components which as shown in FIGS. 16 to 18 are positioned on the bottom shell by means of moulded-on projections and fixed by crimping without the application of heat. In order that this spring arm arrangement can raise up the separated picture as early as possible, the corresponding side piece 44 of the slider member has recesses 130. Secure holding of the separated picture is ensured during this phase of the change-over cycle by means of the spring arms 80, which bear the extreme edge of the picture remote from the slider member upwards like a bracket.

In certain circumstances, the retentive coating 26 may hold the separated picture so firmly that the force of the spring arms 79 is not sufficient to lift up the edge of the picture facing towards the slider member. FIGS. 19 and 20 show a first possibility for additionally pushing this edge away from the retentive coating: the two strips of retentive coating are each arranged on a separately produced bar 134. On each side of the strip 26, the bar has moulded-on resilient bridge portions 132 which after the separator bar 20 has passed over them spring out upwards and lift the edge of the picture. Alternatively, as shown in FIGS. 21 and 22, separate metal leaf springs 136 may be provided.

The shape of the bars 134 can be seen from FIGS. 32 and 33. It is to be appreciated that they are mirror-symmetrical in shape and therefore have lands 68 at both ends with edges 72. The reason for this is that when the bars are to be coated automatically with the retentive coating no sorting is necessary. In addition, apertures 138 must of course be provided, through which project guide or wedge-like projections 140 for the separator bar which are moulded onto the bottom shell of the housing on the end at which it is gripped by the user. The bars are fixed in the bottom shell by pressing the lugs 142 into corresponding channels in the bottom shell of the housing, and they are accurately positioned by means of one of the two pins 144, namely by means of the pin remote from the grip part of the slider member, while the other pin has associated with it a slot in the housing.

The bars 134 at the same time form the guide for the control key 87 arranged in the plane of symmetry, the shape, arrangement and operation of which is illustrated schematically in FIGS. 23 to 25. FIG. 23 shows the operating position, that is to say, in this position of the control key 87 the normal changeover operation occurs. The control key 87 carries a projection 146 which points towards the separator bar 20 and has an incision 148, to complement which there is a double-faced projection 150 on the underside of the separator bar 20. If the control key 87 is now pressed while the slider member is held firmly, its projection 146 springs out in a downward direction until the double-faced projection 150 locks into the incision 148 (FIG. 24, left). The locking lug 152 projecting downwards from the projection 146 now blocks the separating means for the edge of the bottom picture on the pile, so that when the slider member is pulled the hook-like members 22 slide away from the edge of this picture also when the separator bar together with the control key 87 acts on the edge of the pile nearest to it and takes the pile along with it (FIG. 24, centre). Near the outer end position of the slider member 14, the locking lug 152 meets a recess 154, while the control key guide lugs 158 run onto a stop member 156. The projection can accordingly spring out downwards when the slider member is pulled further, and thus release itself from the separator (FIG. 24, right). When the slider member 14 is pushed in again, the control key is freely movable, so that the double-faced projection easily pushes the key in front of itself, until the key has reached its end position again (FIG. 25).

With reference to FIGS. 9 to 12, two types of construction of blocking means for the change of direction were described. In the present example of execution, blocking means are also provided, but they act only in the "critical" phases of the changeover cycle.

In the bearing eye 116 of the slider member 14 there is pivotably arranged about a journal 160 a control pawl 162 which is guided by a control projection 164 along channels which are defined by guide rails 166 formed on the bottom shell 62, so that the control projection 164 has to follow the path marked by arrows in FIG. 27 during insertion and withdrawal. During the greater part of the changeover cycle the direction of movement may be reversed without hindrance, but not when the control projection 164 is in the channel section 168 during insertion, or in the channel section 170 during the withdrawal. In the first case, if it should be desired to pull the slider member out again shortly before its inner end position, the control projection would run onto the stop member 172; in the latter case if, therefore, the slider member is pushed in again shortly before reaching the outer end position the control projection hits either the stop member 174 or the stop edge 176. It should be noted that the journal 160 is seated in the bearing eye with a degree of friction such as to allow the control pawl to follow the guide bars without any noticeable hindrance, but not to be able to swing freely.

FIGS. 28 and 29 show the shape of the co-operating parts of the separator bar and of the bars 134 with a retentive coating. In the rest position (FIG. 28), thus with the slider member 14 completely pushed in, the shoes 69 sit laterally on the bars, while the pressing rollers 28 project into a recess behind the retentive coating so that their bearings are relieved of their loading and no deformation can occur because of cold flow. At the beginning of the changeover cycle (FIG. 29), the rollers then run first onto a land 178 and are thus lifted up to the level of the surfaces lying in front of the retentive coating 26, while the shoes are on the level of the land 68. The difference in level between 68 and 178 is of operational significance, since it is matched to the thickness of the pictures; both levels are on the same injection-moulded part, so that the tolerancing is extremely good, and there is no problem regarding the running of the rollers 28 onto the edge of the picture.

FIG. 30 shows the end of the spring arm 24 with the transporter in the form of hook-like member 22. Extending on both sides of the transporter there are also projections 180 which are intended to rest against the picture from below and thus prevent the occurrence of the situation indicated by broken lines in FIG. 31, namely when a severely bowed picture fits so deeply into the hook-like member 22 that the latter can no longer slide away from the edge. This possibility must however be offered, so that the whole pile may be removed by means of the control key 87.

FIG. 34 shows in a simplified and enlarged view a longitudinal section through the pushed-together device. As in FIGS. 1 to 10, here too the separator bar has centrally a projection 93 which engages between holding-down members 40. When, as the slider member is pulled out, however, the topmost picture is still supported only laterally by the ribs 36, there is a risk that the topmost picture, or even several pictures, will slip off the separator. This is prevented by the holding-down members 81 on the housing having additionally an inclined stepped member 338 which checks at least the topmost picture for sufficiently long for its opposite edge to come to rest against the bottom side 386 of the separator and be gripped by the projection 93 thereof. Because of the friction of the picture on the bottom surface 390 of the holding-down member 81, this state is maintained even when the pictures (photographic prints) are severely bowed.

In the embodiments described above, the small rollers 28 cooperate with the retentive coatings 26 arranged fixedly in the housing 12. This and other concepts according to the invention are illustrated in FIGS. 35 to 41, wherein only the components necessarily required for an understanding thereof are shown.

FIGS. 35 to 37 relate to a different type of retaining means for the sheet to be separated.

FIG. 35 shows a device according to the invention in schematicized longitudinal section. FIG. 36 is a partial cross-section of this Figure and FIG. 27 shows a partial horizontal section.

The device shown in FIGS. 38 to 40 shows a further embodiment of the retaining means according to the invention. The individual sheet 188 passes behind the separator bar 20 in the working gap between two rollers 300,306, at least one of which is driven in the same manner as that described for FIGS. 35 to 37. The other roller may also be driven directly by the first, or alternatively be moved by friction. The pressing force is produced by the fact that one of the rollers, preferably the one which is not driven, is of resiliently compressible construction, and its shaft is placed somewhat nearer to the other roller that would actually correspond to the diameter. The cross-section through such a resilient roller is shown in FIG. 40, from which it can be seen that blind recesses extend round the hub in a meandering arrangement so that there is always sufficient springiness available.

FIG. 41 shows a roller 300 which is rotatably supported on the housing 12, forming the second frame part in this case, which roller is driven by way of a toothed rack (not shown) mounted in the side pieces 44 of the slider member, and a pinion (not shown) arranged to drive with the roller at a peripheral speed which is equal to the withdrawal speed of the slider member. In this way, the separated picture 188 is apprehended behind the separator bar 20, pressed against the top wall 26 of the housing, along which it slides, and released in the outer end position of the slider member. It is to be understood that as feeding means one of the assemblies illustrated in FIGS. 1 to 34 and 42 to 82 is provided in each case, without this being also illustrated every time.

Different feeding means, shown in FIGS. 42 to 60, may cooperate with the described retaining means. With a view to simplifying the description, comments in respect to FIGS. 35 to 41 apply analogously. Moreover, it should be noted that the retaining means according to the invention may be supplemented by further means, for instance with elements that engage the separated picture pincer-fashion.

FIGS. 42 and 49 firstly illustrate the principle. In FIG. 42 the first frame part can be seen in the form of the substantially rectangular housing 12 in which the slider member 14 is arranged to slide as the second frame part. The separating means is indicated only symbolically as a separator bar 20. The pile of sheets of like format is indicated by 182.

FIGS. 50 and 51 show diagrammatically that the arrangement according to the invention can also work according to the principle of operational reversal in such a way that the inclined face 22 is for example integrally-moulded rigidly onto the first frame part—which in this case is in the form of a housing—while the spring bias is produced by means of a leaf spring 24 fastened to the opposite wall 210. FIG. 50 shows the rest state and FIG. 51 the start of the withdrawal travel of the other frame part in the form of a slider member, the individual sheet 188 being already separated.

FIGS. 52, 53 and 54 finally show further arrangements of the apparatus according to the invention.

In FIG. 52 the transporter 22 comprises a compressible layer 212 on a carrier plate 214 which is connected by means of links 216 to the floor 218 of one of the frame parts. A coiled torsion spring 24 with projecting ends presses the transporter against the rear edge of the sheet 188 which is to be separated.

According to FIG. 53, the transporter 22 is in the form of a plate 220 which engages with an upwardly projecting edge 222 behind the rear edge of the sheet 188 which is to be separated. The bias arrangement comprises a helical tension spring 24 which is anchored to a fixed point and engages with a parallelogram linkage mechanism 224 to which the transporter plate is linked. In this way the transporter is held independently of the thickness of the pile parallel to its principal plane.

According to FIG. 54, the transporter 22 is a projection 226, protruding from a leaf spring 24 which extends transversely to the direction of movement of the sheet 188 being separated symbolised by means of the arrow 228; here also the transporter is essentially always in the same operative position with respect to the sheet edge, regardless of the number of sheets in the pile.

FIGS. 55 to 60 show, substantially schematicized, further different feed systems based on different principles.

According to FIG. 55, the first frame part has a moulded toothed rack 416 with which a pinion 418 rotatably mounted in the second frame part engages and, during the relative movement, drives a transporter roller 420 which frictionally engages the sheet 188 to be separated and transports it.

FIG. 56 shows an embodiment having a plate 422 which has a retentive layer 26 which is able to engage frictionally and transport the sheet lying against it. The level arrangement is ensured by the mounting of the plate by means of a first pivot 424, and a second pivot 426 and biassing spring, in this case a coiled torsion spring 428 with projecting ends.

FIG. 57 shows an embodiment in which the feeding means also functions by means of a transporter with retentive means. In this case, the first frame part is designed as a slider member, and the second frame part as a housing. There is arranged on the slider member 14 a transporter with retentive means 26 which draws off the sheet to be separated from the pile 182 and conveys it to the separating means which is indicated here simply as a separator bar 20. In the second frame part (that is the housing 12), there is formed a control channel 430 along which the transporter with retentive means is guided-away over the separator bar without coming into contact with the latter.

FIG. 58 shows how a transporter with retentive means 26, arranged near the distal end of a lever 432, by running up an actuator slope 434 on the second frame part (slider member 14), is pivoted about its pivot 436 on the first frame part (housing 12) to lie against the sheet of the pile facing it and in this manner, during a part of the travel of the relative movement of the parts, conveys this sheet to the separating means, symbolised by the separator bar 20.

FIG. 59 shows in a schematic side view, and FIG. 60 shows in a plan view of a partial section a feeding means which is effective not just at the beginning of outward travel of the frame parts, but is effective already during the last part of the inward travel of the preceding change operation.

In similarly schematic manner to the illustration and description of the feeding means, separating means that may be used in the picture changer according to the invention shall be explained below.

FIGS. 61 to 76 illustrate alternative separating means.

FIGS. 61 to 76 show alternative separating means.

Figure 1:
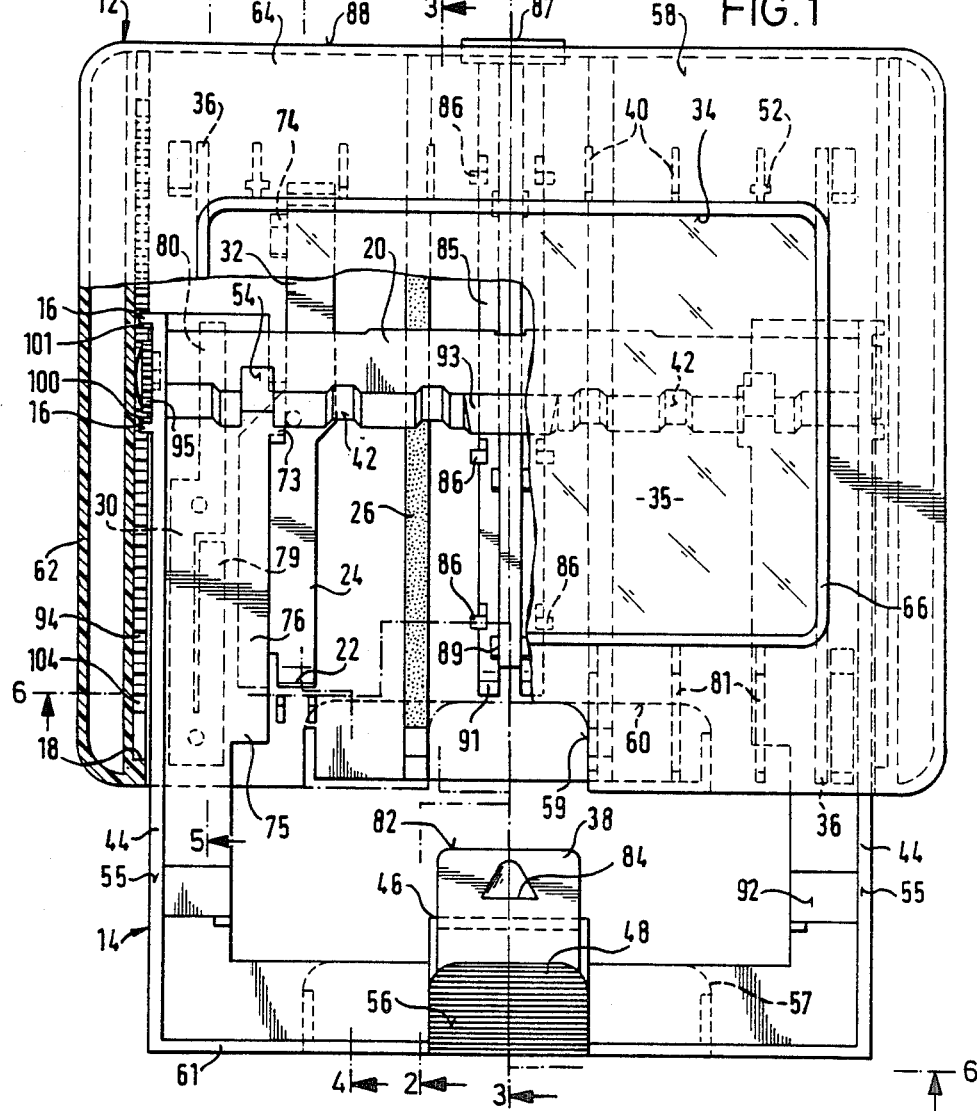
Figure 2:
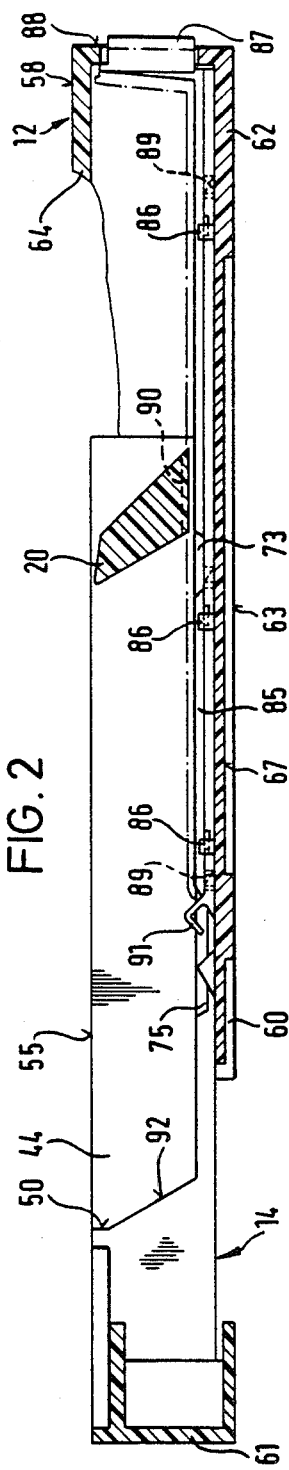
Figure 3:
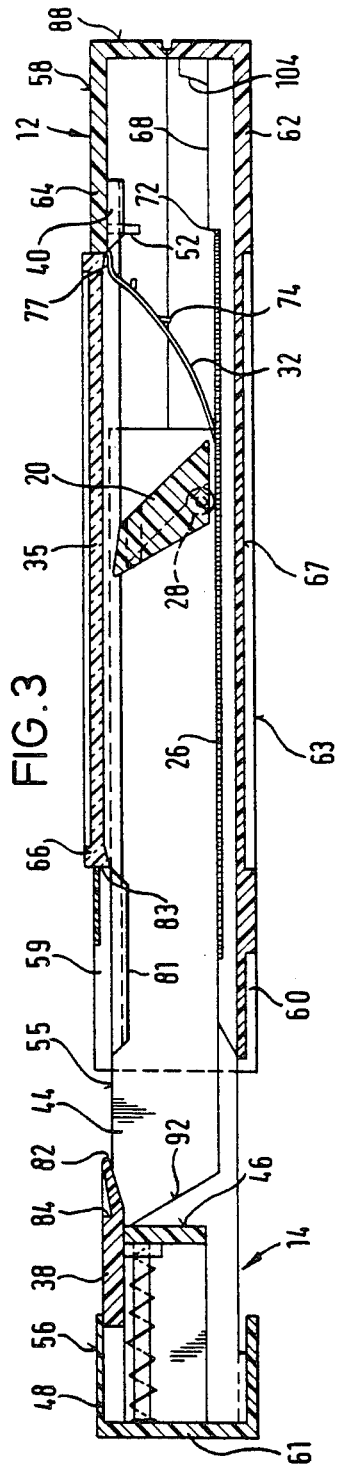
Figure 14:
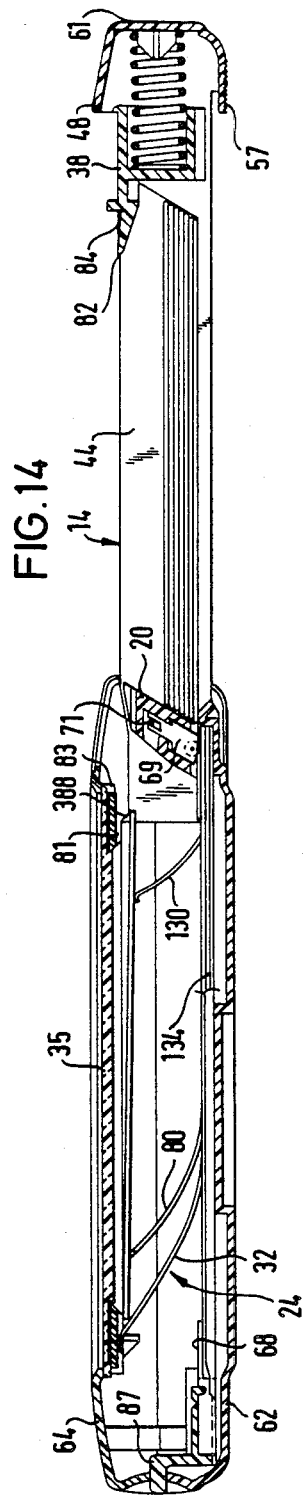
Figure 15:
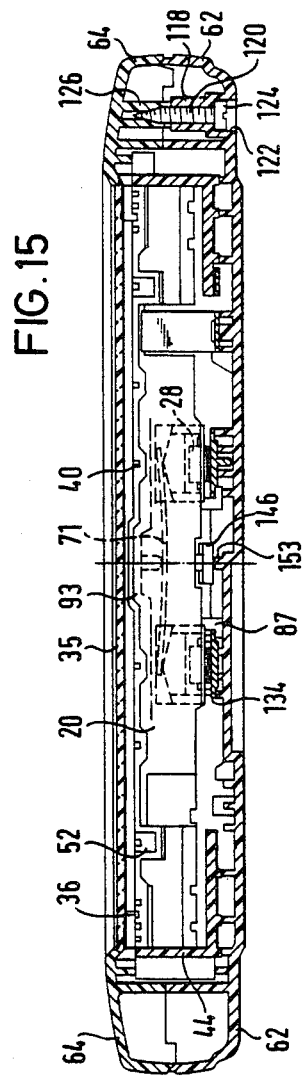
Figure 17:
Figure 18:
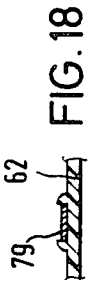
Figure 16:
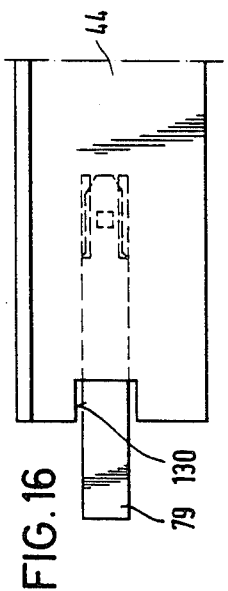
Figure 19:
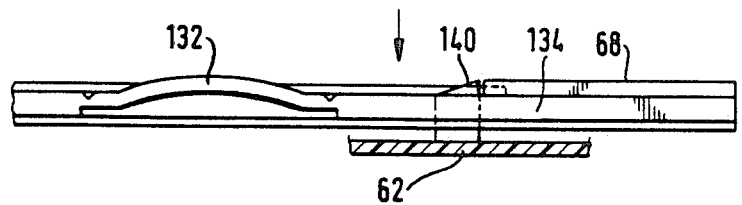
Figure 20:
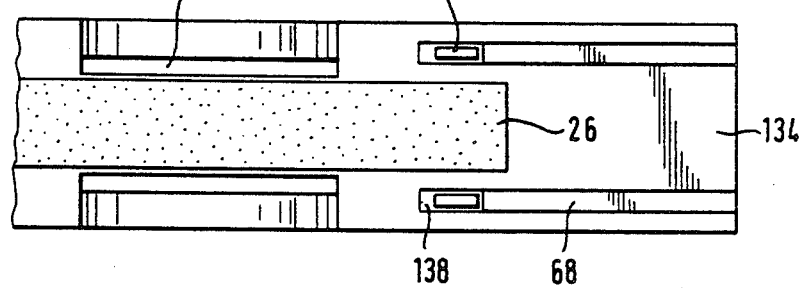
Figure 21:
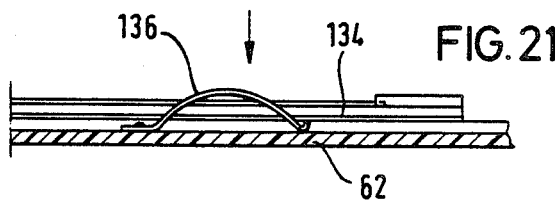
Figure 22:
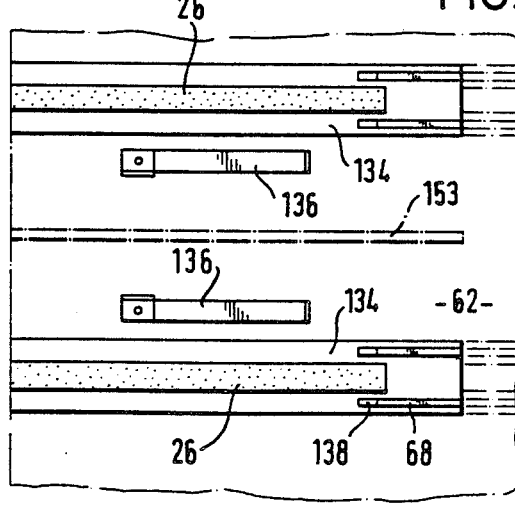
Figure 41:
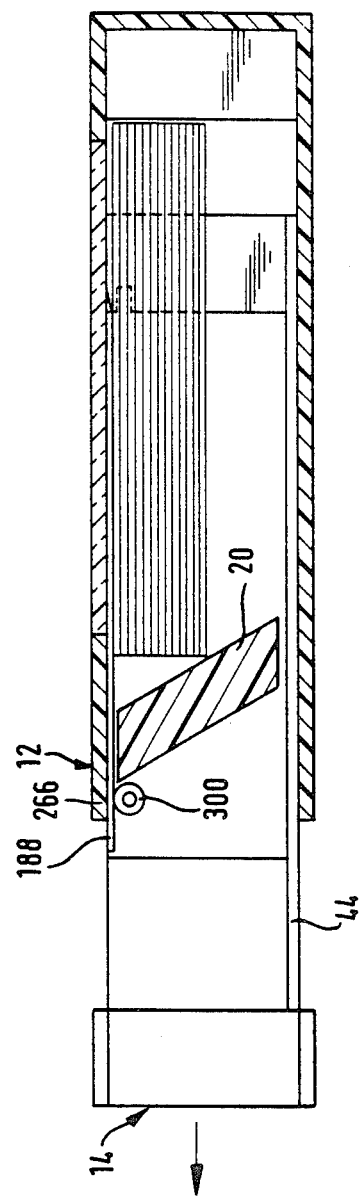
Figure 42:
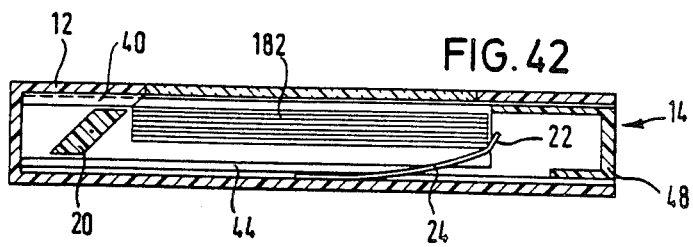
Figure 43:
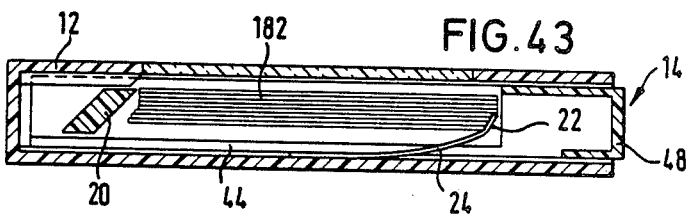
Figure 44:
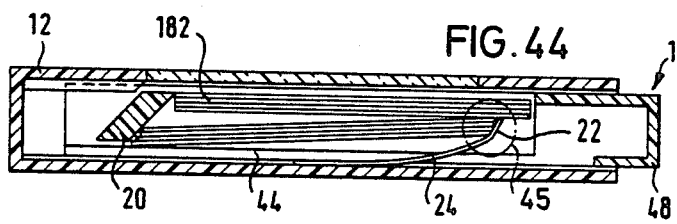
Figure 45:
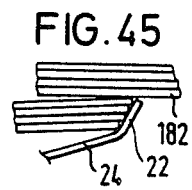
Figure 46:
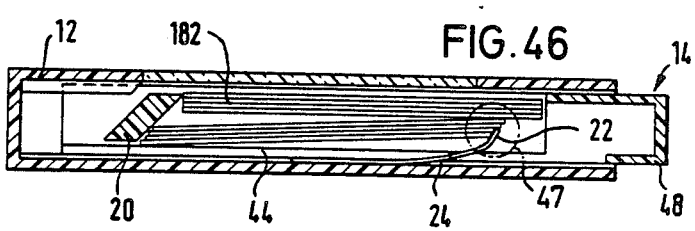
Figure 47:
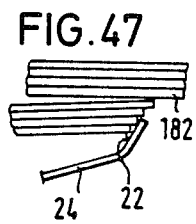
Figure 48:
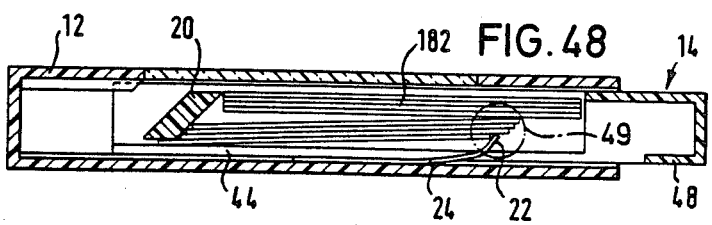
Figure 49:
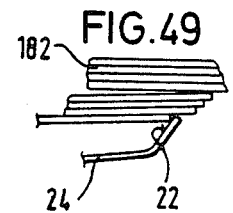
Figure 52:
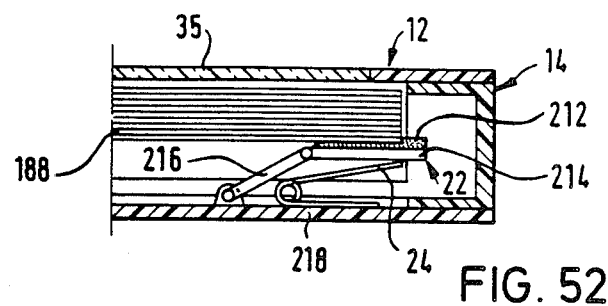
Figure 53:
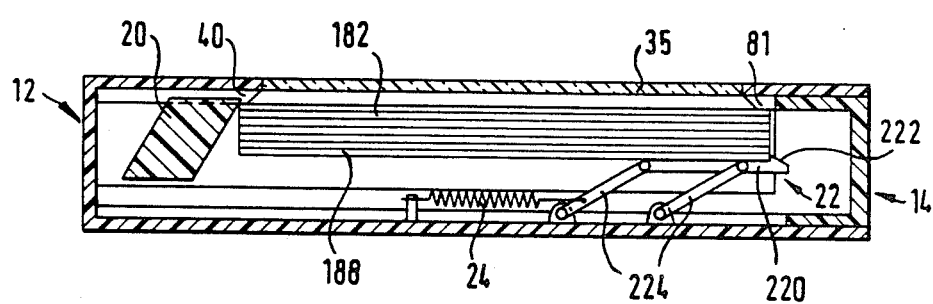
Figure 54:
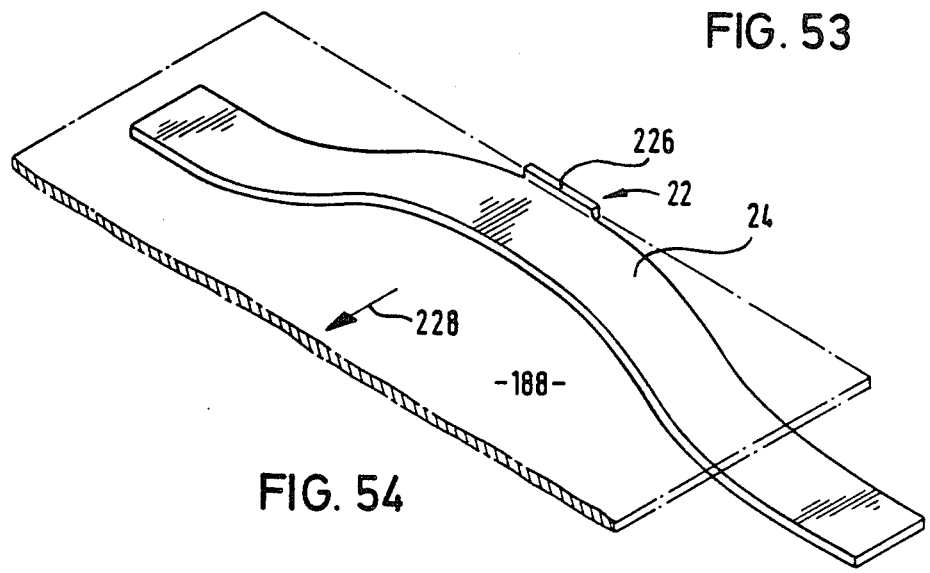
Figure 58:
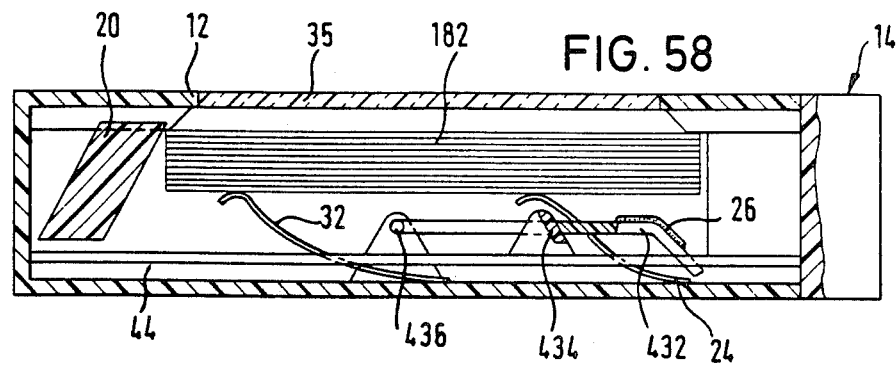
Figure 59:
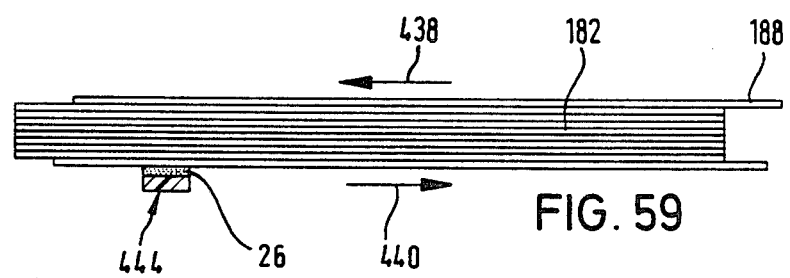
Figure 60:
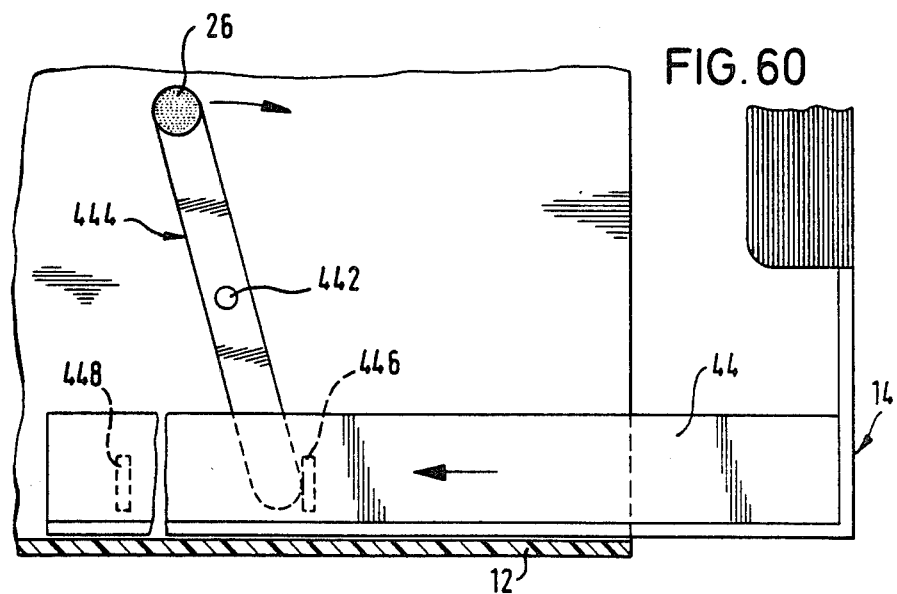
Figure 62:
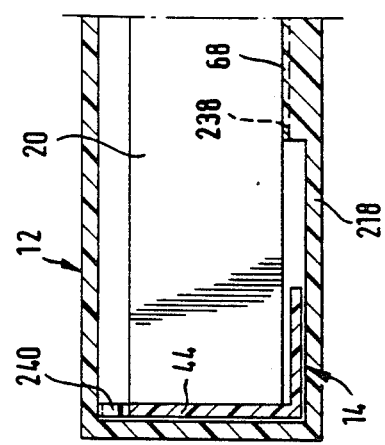
Figure 61:
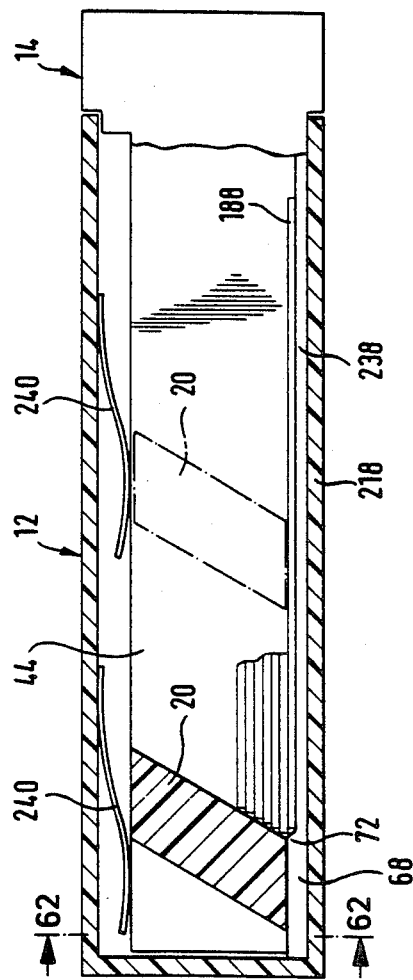

FIG. 61 shows a photograph changer in a schematic longitudinal sectional view, and FIG. 62 is a corresponding partial transverse section. The first frame part is in the form of a housing 12 on which a first, stationary separating member is moulded in the form of a rib 238 which is located on the floor 218 of the housing. The second separating member is formed by a separator bar 20 which is moulded on a slider member 14 displaceable relative to the housing and forming the second frame part. The slider member 14 is pressed in the direction of the floor of the housing, and thus in the direction of the ribs 238, over its entire withdrawal travel distance by a system of leaf springs 240 which is mounted in the housing.

Figure 64:
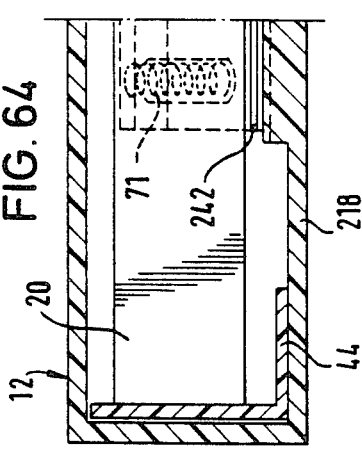
Figure 63:
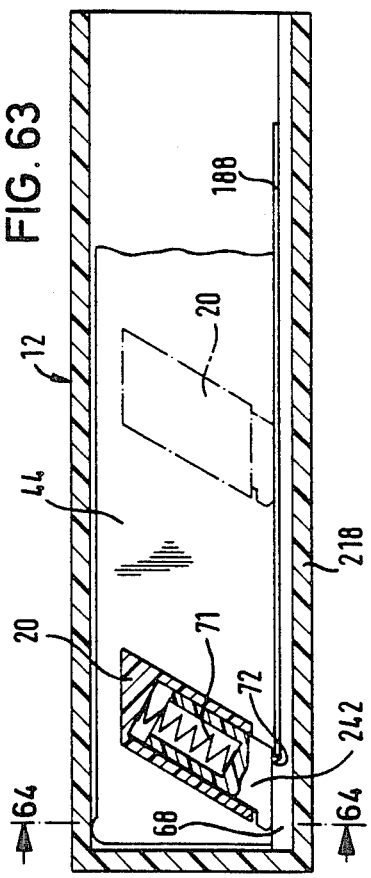

The embodiment according to FIG. 63 (longitudinal section) and FIG. 64 (partial transverse section) differs from that described previously in that not the whole slider member 14 but only a part 242 of the separator bar 20 is pressed in the direction of the floor of the housing 218 by a spring arrangement 71 housed in the separator bar itself, while the slider member is supported in this direction. The operation is otherwise the same.

The embodiment according to FIG. 65 (longitudinal section) and FIG. 66 (transverse section) differs from that according to FIGS. 61 and 62 in that although in this case the slider member is in fact pressed by the system of leaf springs 240 in the direction of the floor of the housing 218, no land is provided on the housing; instead there are moulded onto the separator bar 20, on both sides of the gap 244 for the passage of the sheets, shoes 246 which are supported on the floor 218 of the housing and thus constantly keep the spacing of the gap at the desired value.

The embodiment according to FIGS. 67 (longitudinal section) and 68 (partial transverse section) is a modification of the embodiment in FIGS. 63 and 64. Between the side pieces 44 of the slider member a fixing device 248 is provided which holds a stationary end of a resilient leaf spring 250 clamped in by its wide side. The rounded end of the leaf spring touches the land 68 and after the edge 72 of the latter has been passed moves onto the separated sheet 188.

The embodiment according to FIG. 69 (longitudinal section) and FIG. 70 (partial transverse section) also has a separating member which can be resiliently deflected relative to the slider member 14 and is in the form of a separator bar 20 which is pivotable about a shaft 252 in the side pieces 44 of the slider member, but is held by means of a spring arrangement 240 with its edge 254 resting against the part situated opposite, that is to say, firstly on the land 68 and then, after its edge 72 has been passed, on the separated sheet 188.

The embodiment according to FIG. 71 (longitudinal section) and FIG. 72 (partial transverse section) comprises as the first frame part a housing 12, and as the second frame part a slider member 14. Between the side pieces 44 of the slider member a foot plate 256 is inserted which forms a first separating member. The second separating member is a separator bar 20 which is biased relative to the slider member in the direction of the floor 218 of the housing by a spring arrangement 240, is guided on rails 258, and has stop shoes 246 on its lower end on both sides of the sheet which is to be separated.

FIGS. 73 (longitudinal section) and 74 (partial transverse section) show an embodiment in which the first frame part is formed by a slider member 14 which can slide backwards and forwards relative to a housing 12 as the second frame part. It is to be understood that here again, as with all other embodiments, the maximum travel of the slider member is limited by means of stop members, which are not however shown, for the sake of clarity. Formed in one piece with the housing 12 as the first separating member there is a separator bar 20 opposite which a second separating member is provided in the form of a plate 264 with an articulated mounting (link 260) which plate is pressed by a spring 240 against lateral support projections 262 of the separator bar. The plate 264 can therefore absorb manufacturing tolerances, while the gap height is fixed by means of the height of the projections 262, which is practically invariable.

FIGS. 75 (longitudinal section) and 76 (partial transverse section) show an embodiment in which the housing 12 forms the second frame part and a slider member (not shown) the first frame part. A separator bar 20 is guided on the housing so that it can slide transversely with respect to the principal plane of the pile and is biased by means of a spring arrangement 240. With its support projections 262 it defines the gap height, which is defined on the other side by means of the top wall 266 of the housing.

FIGS. 77 to 81 serve to explain the so-called length compensation. Since the sheets in fact have nominally equal dimensions, but these may be liable to large tolerances, especially in the case of photographic prints, there is a risk that operation will be disrupted when there are successive sheets of considerably different dimensions in the pile. It is possible to solve this problem, however.

FIGS. 77 to 81 illustrate the measures which may be taken in order to guarantee feeding even where the pile contains sheets with considerable differences in dimensions in the direction of the changeover movement.

Figure 77:
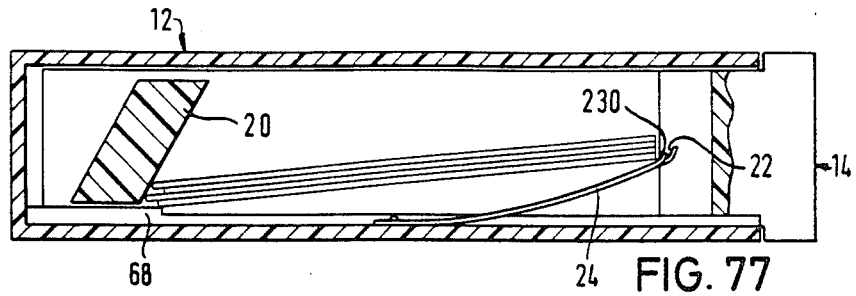
Figure 79:
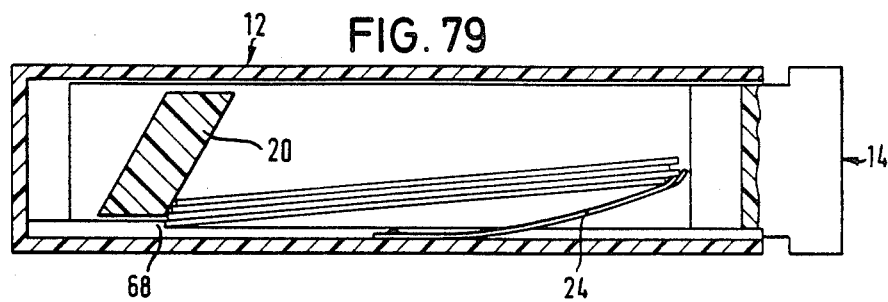
Figure 78:
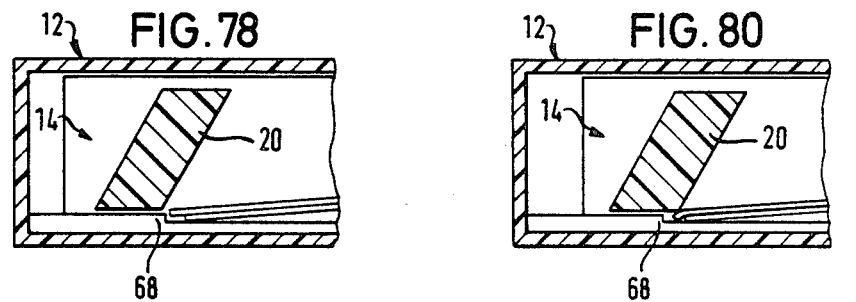
Figure 80:
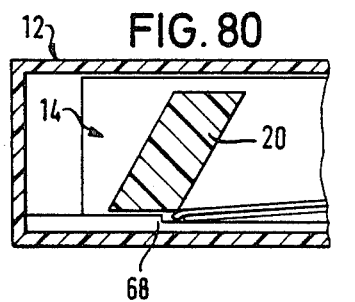
Figure 81:
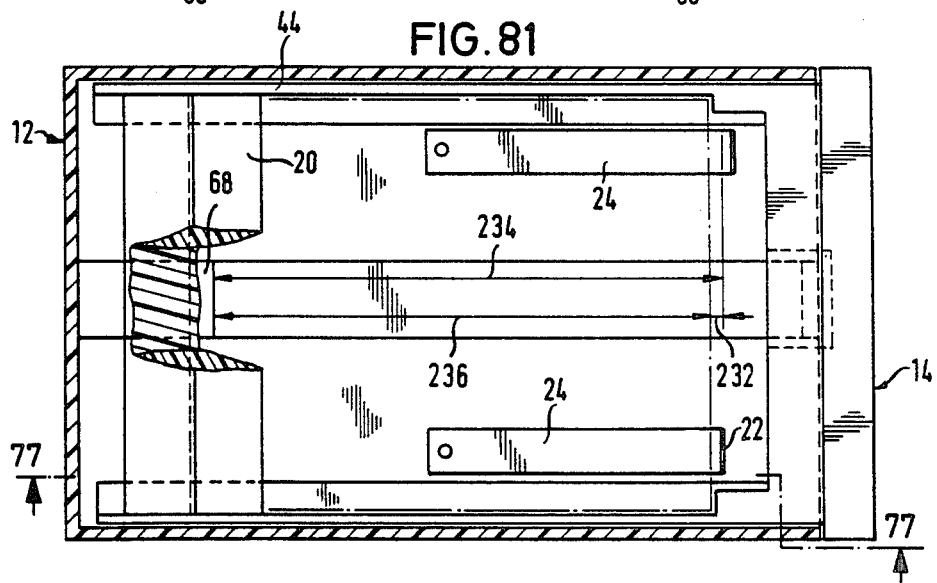

FIG. 77 shows in longitudinal section the situation after a changeover cycle. A stop member provided on the slider member 14 has aligned the edges of the sheets remote from the separator 20 so that their ends projecting to different extents out of the pile—or standing back in the latter—form the configuration indicated in FIG. 77. The case of a longer sheet lying over a shorter sheet is shown separately again in FIG. 78, and FIG. 79 illustrates schematically what could happen if provision was not made for compensation: the second lowest sheet places itself with its free projecting edge over the end edge of the lowest sheet, and when the separator bar 20 runs on, the situation shown in FIG. 80 occurs, in which the changeover operation is disturbed (double sheet changeover). In order to prevent this, means are provided in order first of all to align the edges of the sheets somewhat on the side of the pile facing towards the separator bar. For this purpose there is firstly provided an "idle movement" of the separator bar 20 until it runs over the land 68. During this movement, therefore, no separation occurs. Nevertheless, the extreme edges of the sheets remote from the separator bar are already supported by a first contact face 230 during this idle movement travel. Sheets which are oversize are pressed back by the separator bar and spring away from the contact face 230; sheets which are undersize still remain on the first contact face. The sheets which have sprung away from the latter, however, are apprehended by a second contact face 22 which is provided at a distance 232 behind the first which corresponds to the maximum permissible difference in lengths of the sheets. In FIG. 81 the shortest sheet is symbolised by the arrow 234, and the longest by the arrow 236. When the separator bar has passed through its idle movement, the shorter sheets are therefore supported by the first contact face and the longer sheets by the second contact face, so that approximately the situation shown in FIG. 79 is produced in the region of the edges of the sheets facing towards the separator bar. It is sufficient here for the length compensation to be only approximate, so that the sheets are no longer flexible enough to allow the situation in FIG. 80 to occur.

In a similarly simplified manner to the feeding and separating means, FIGS. 82 to 98 illustrate constructional features of the guide means and embodiments thereof that are alternatives to those of FIGS. 1 to 34 which may be used within the concept of the invention.

Figure 82:
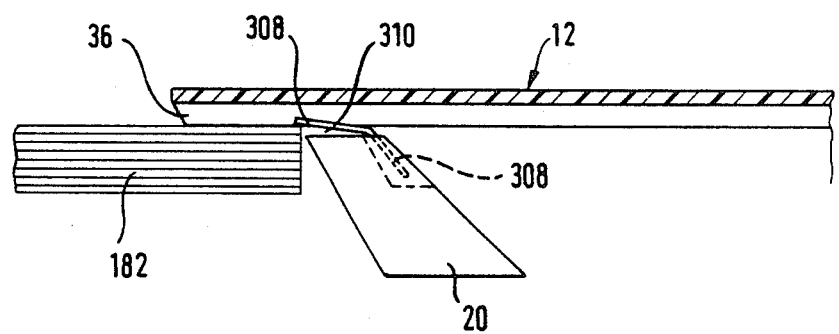

FIG. 82 shows in schematical partial longitudinal section an arrangement that holds down the remainder of the pile for the insertion of the separated sheet and blocks the return through-gap at the start of the changeover cycle.

Figure 83:
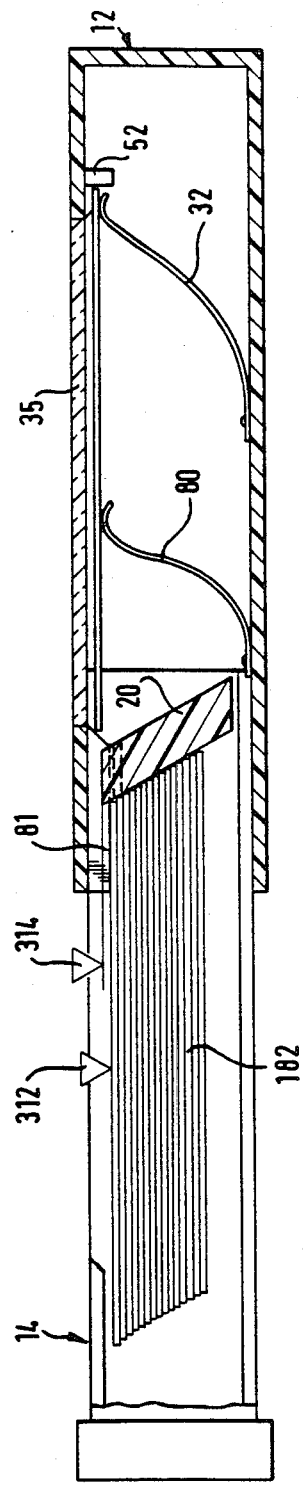

FIG. 83 shows in a schematicised sectional view the preferred means: the spring 32 holds the rear edge of the sheet in front of the slider member stop member 52, the spring 80 supports the sheet approximately centrally, and behind the separator bar 20 the remainder of the pile 182 is held on a level according to the arrow 312, by the holding-down members 81 acting on it. The arrow 314 defines the level of that edge of the separator bar over which the individual sheet passes and which is in an inter-engaging engagement with the holding-down members.

Figure 84:
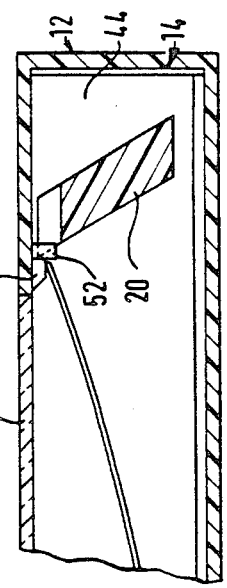

FIG. 84 shows in a schematic partial sectional side view a construction which serves to prevent a sheet also arriving incorrectly in the gap during the separating phase of the changeover cycle at the through gap for the return of the sheet. In this case, this requires the ribs 40, which engage (somewhat like the teeth of a comb) in recesses in the separator bar 20.

Figure 85:
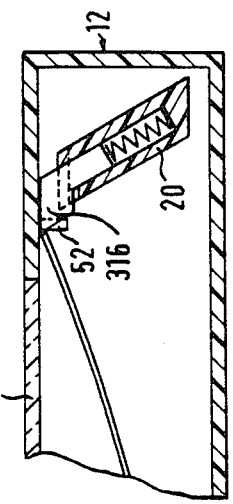

Alternatively, in FIG. 85 blocking members 316 moving out of the separator bar are shown which free the through gap (either by spring action as the result of running on an actuating means or by positive displacement) only when a sheet edge is present in the return phase (this may be thought of as a "non-return valve principle").

FIG. 86 shows these means just in principle in a schematicised longitudinal section: a first leaf spring 32 holds the individual sheet 188 in front of the "pushing" stop member 52, and further leaf springs 79, 80 press the sheet as flat as possible against the top wall of the housing 12 (first frame part), in order to present the leading edge of the individual sheet fairly accurately in front of the through gap 310. Reliability will be so much the greater, the longer the leaf springs engage with the individual sheet during the sheet return, before these springs are passed over by the separator bar 20 of the separating means. The side of the separator bar which faces towards the individual sheet 188 is preferably inclined in such a way that a leading edge of the individual sheet which is bowed downwards in front of it can "climb up" along the incline as a result of the camming effect of the latter. But if this sheet edge is forcibly presented to the return gap by other means, the corresponding surface of the separator bar may also be constructed to run perpendicular to the plane of the sheet.

Instead of the leaf spring 32, other means may be used in order to displace the edge of the individual sheet remote from the separator bar against the other housing edge. This is shown in FIG. 87: a guide member 318 has been pushed by a spring 320 beneath this edge of the sheet 188 and has raised it up in front of the pushing stop member 52, still during the first half of the changeover cycle. The other sheet edge is then, after the separator bar 20 has passed, lifted up by a leaf spring 79 in front of the return gap 310. Towards the end of the second phase of the changeover cycle, the separator bar then pushes the guide member 318 back. Instead of the spring 320, the guide member 318 could also, by means of coupling to the second frame part, but with a "phase shift", be moved to and fro by the latter. Instead of the movable guide member, inclined wing-like guide members which are capable of being pivoted in and out could be provided, without any change in the operating principle. FIG. 88 shows schematically a plan view of the guide member 318, and FIG. 89 represents the situation at the point of reversal of the changeover cycle.

Figure 90:
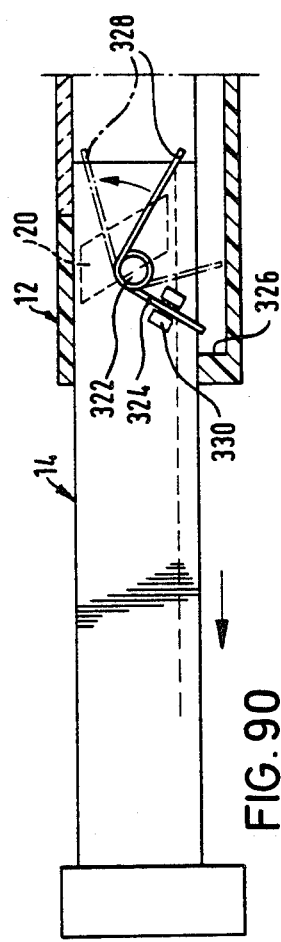

FIG. 90 shows a schematic side view of a mechanism which can be used instead of the lifting spring 79. A wire spring 324 is pivotable with its eye about a pin 322. One of its arms is angled and engages from outside transversely beneath the edge in question of the individual sheet, and the other arm can be moved over by engaging a stop member 326, carries the angled arm 328 along with it, and thus causes the edge of the sheet to be lifted. A limits-defining device 330 is indicated, in order to eliminate uncontrolled movements of the mechanism;

the latter is indeed only to be switched over in the two end positions (rest position/point of reversal).

Figure 91:
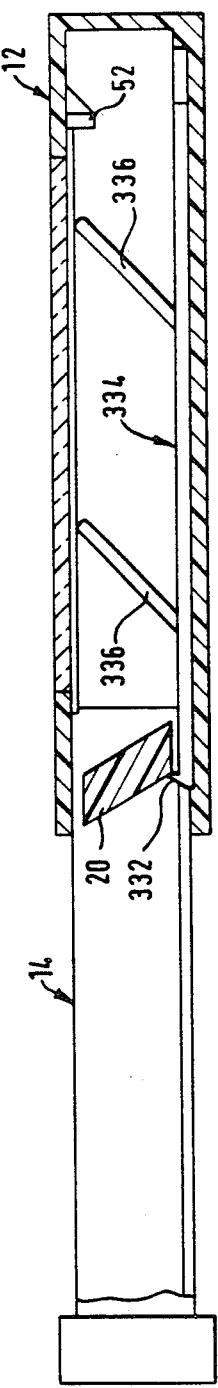
Figure 92:
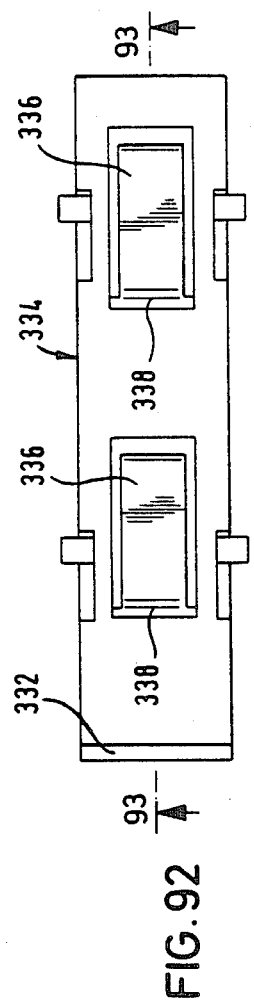
Figure 93:
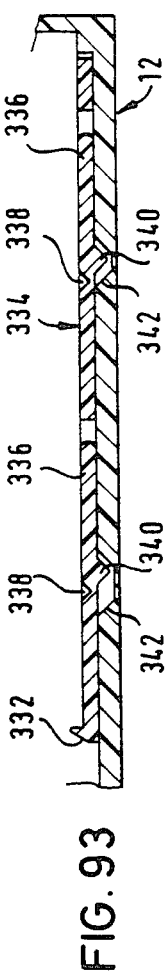

FIGS. 91 to 93 show an alternative form of the lever arrangement as guide means. The separator bar 20, shortly before its reversal position, meets a hook-like transporter 332 of a lever member carrier 334 to which two lever-like members 336 are linked by means of moulded-on pivots 338. By means of the displacement of the lever member carrier, the projections 340 formed on the underside of the lever-like members run onto actuating parts 342 of an actuator so that the lever-like members are raised up. During the return, the separator bar firstly meets the lever-like member nearest to it and presses the entire lever member carrier back for a short distance until the lever-like member is moved over; the other lever-like member, however, stays still, since the actuating parts 342 for the two lever-like members are at a greater distance from each other than the corresponding projections.

Figure 94:
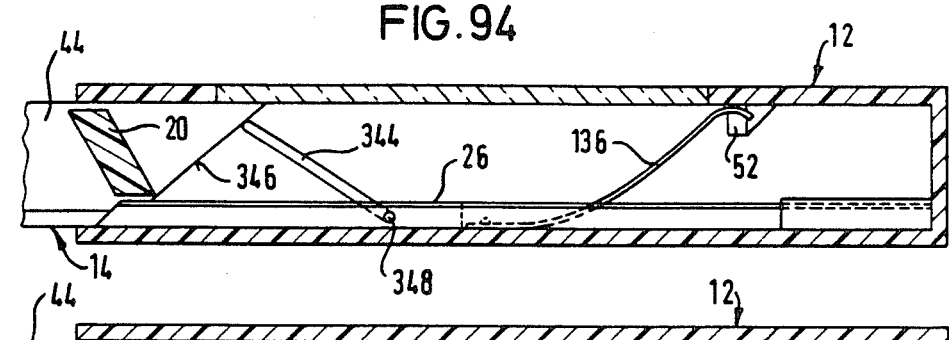
Figure 95:
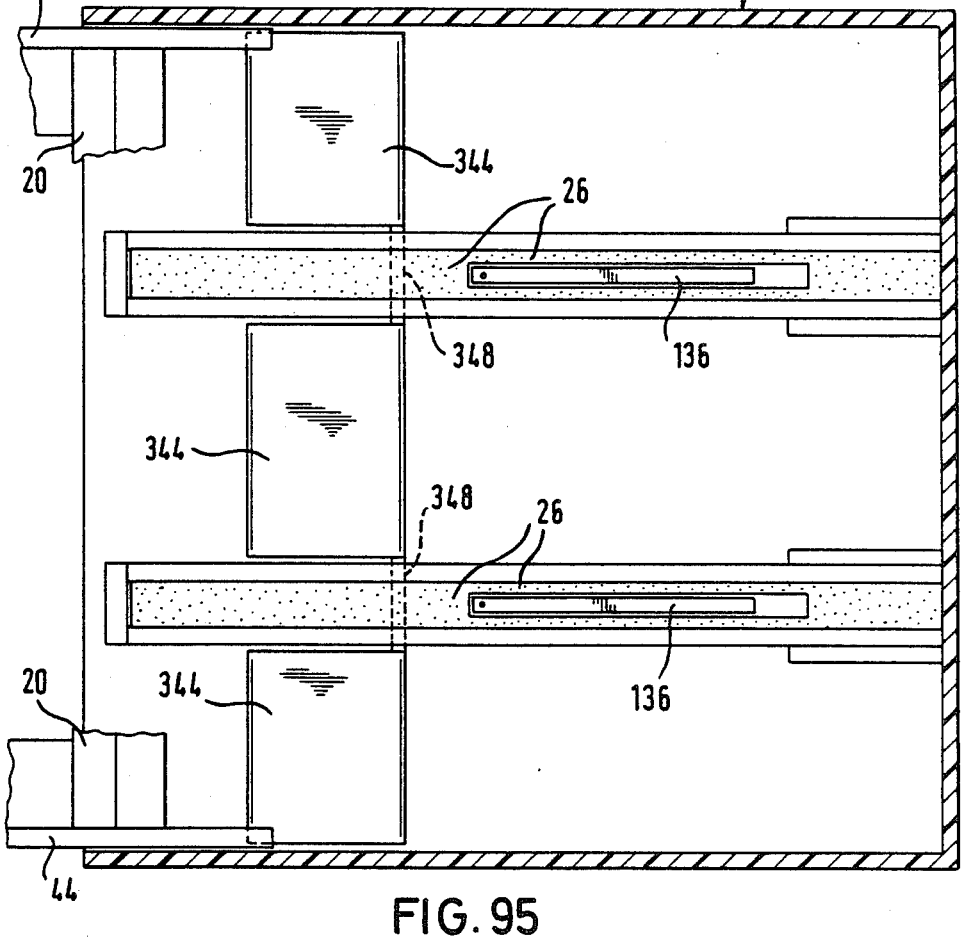

The embodiment according to FIGS. 94 and 95 represents an embodiment in which the retaining means for the individual picture comprises retentive coatings 26 in the first frame part. As a result of static charging, as mentioned above, the individual sheet may adhere so firmly to the retentive coatings that considerable forces are required to tear it away from them. It must however be guided onto the side of the frame part remote from the retentive coatings. The springs 136 are therefore provided centrally between two retentive coatings in each case. The edge of the individual sheet facing towards the separator bar 20 is lifted by a lever-like member 344 which is pressed down by means of actuator slopes 346 on the ends of the side pieces 44 of the slider member, while it is lifted up by a spring force (not illustrated). As can be seen from FIG. 95, the lever-like member extends over the entire width of the device, and in particular it also engages with the individual sheet directly adjacent to the retentive coatings. The shaft of the lever-like member is indicated by 348.

FIGS. 96 to 98 show another alternative form. On the separator bar 20, on both sides of the retentive coating 26, a thin plate-like member 350 is arranged so that it engages resiliently in a corresponding recess near the retentive coating. The two thin plate-like members are connected to each other by means of a bridge member 352. When the individual sheet runs through, each thin plate-like member is lifted up resiliently and snaps back into the recess after the rear edge of the sheet has passed, so that during the return travel the sheet edge in question is pulled away from the retentive coating and the edge has to climb up along the separator bar, since the return path through the other through gap is now securely blocked by means of the thin plate-like members.

In FIGS. 1 to 10 and 13 to 34 two different concepts have been shown to "disable" the changeover mechanism and to transport the pile completely out of the housing 12 using the slider member 14. FIGS. 99 to 105, likewise greatly simplified, illustrate other concepts for this so-called complete removal.

Figure 99:
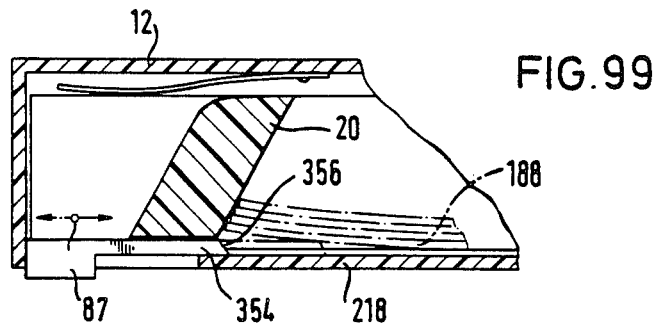

FIG. 99 shows in a partial longitudinal sectional view an embodiment in which the separating means can be blocked at will by manual intervention. It is to be assumed that there is a separating means according to FIGS. 35, 36 but in this case only the separator bar 20 of the slider member is shown. The land 354 is not stationary, as in FIGS. 35 and 36, but is movable in the direction of movement of the slider member, and displacement may be effected manually by means of a control key 87 projecting through the base 218 of the housing. In the position shown by solid lines, this corresponds to FIG. 35 (normal operation). But if the control key is displaced with the land towards the right, the wedge-shaped end 356 engages beneath the edge, facing towards it, of the bottom sheet 188 in the pile and lifts this edge onto the land 354, so that the through gap beneath the separator bar is "closed".

Figure 100:
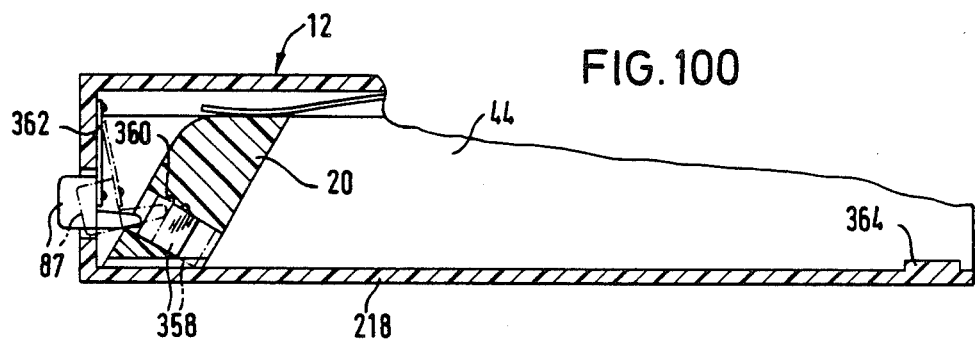

The pile removal function is also manually controllable in the embodiment according to FIG. 100 (partial longitudinal section). It is to be assumed that as initial construction the one according to FIGS. 65 and 66 is provided.

Figure 101:
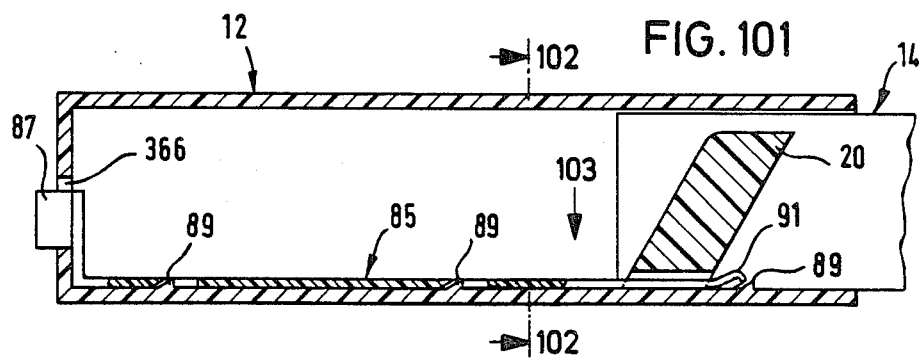
Figure 102:
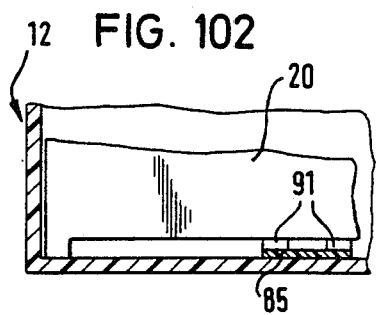
Figure 103:
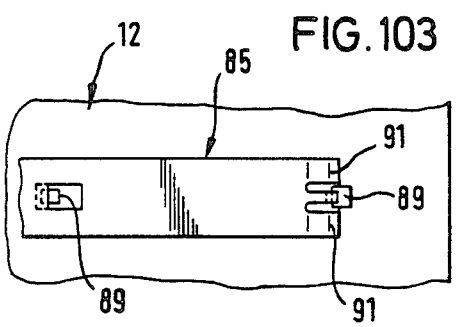

Also in FIG. 101 (partial longitudinal section), FIG. 102 (partial transverse section) and FIG. 103 (partial plan view) provision is made for a manual switchover between "changeover" and "pile removal". In the housing 12, a one-piece component 85 is displaceable in a longitudinal direction by means of pressure on the control key 87, with the rail connected to the control key running up on ramps 89 and in so doing lifting the whole component 85; a clearance space 366 for the control key is provided in the housing for this purpose. By means of the lifting of the rail, the latter comes to rest from below against the edge of the separator bar 20 defining the through gap. From this end of the rail lugs 91 also project upwards and these can spring out downwards when the separator bar runs over the lugs, taking the entire pile along with it. If the separator bar is pushed back again, it meets the lugs and thus displaces the whole component 85 into its initial position, so that the path for the separator is also freed again, the gap for the separation of the sheet is open again and thus the changer is again in the "changeover function" position.

Figure 104:
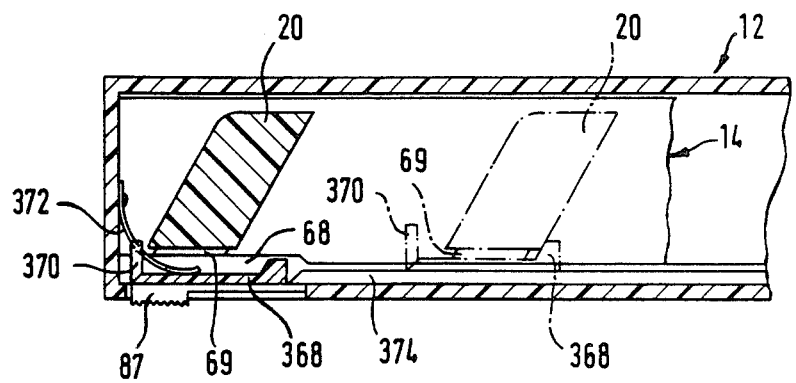
Figure 105:
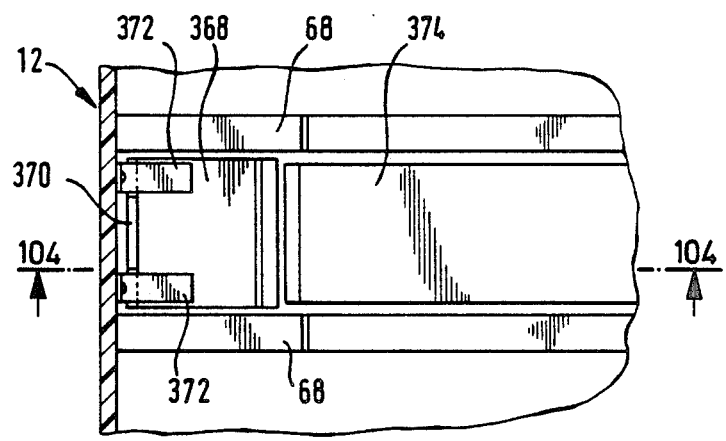

FIGS. 104 and 105 show in a partial longitudinal sectional view and in a partial plan view a further embodiment of a separating system that can be switched over for the removal of the pile. It is to be assumed that in principle the type of construction according to FIGS. 63, 64 is provided. The land indicated by 68 in FIG. 61, which is also present in fact in FIG. 63, is very narrow, and therefore of double construction. The part 69 which defines the through gap and is arranged resiliently in the separator bar 20, has a recess opposite the gap between the two lands 68. Moulded onto the base 218 of the housing there is a control key 87 which can be pushed in and springs back, and which lifts up a blocking shoe 368 which with its forwardly-extending part blocks the through gap whilst it lies in front of the underside of the separator bar and engages behind the separator bar with a rearwardly extending part 370. On both sides of the latter projection, small leaf springs 372 press the blocking shoe in the direction of the base of the housing. If the control key 87 is pressed and the blocking shoe is brought into a drive connection with the separator bar, with the separating function being blocked, and the slider member is now pulled, the blocking shoe is simply taken along also. During reinsertion, the small springs 372 then push the shoe into the release position again, where a trough-like recess is provided behind the run-up ramp 374.

I claim:

1. A device for cyclic rearrangement of a pile of substantially planar rectangular sheets, said pile having a principal plane parallel to the plane of said sheets, comprising first and second frame parts movable relative to each other in a predetermined direction parallel to said principal plane, and including means for removal of an individual sheet from one end of the pile leaving a remainder of said pile and for adding said individual sheet to the other end of the remainder of the pile upon reciprocal relative movement of the frame parts, said individual sheet having a first substantially planar face in contact with said remainder of said pile prior to removal, said means comprising:

means for separating said individual sheet from the pile, means for feeding sheets to said separating means, retaining means for holding said individual sheet in said first frame part and the remainder of the pile in said second frame part, and means for guiding the individual sheet after separation for the purpose of returning it to the other end of the remainder of the pile, wherein said retaining means comprises:

a roller element rotatably journalled to said second frame part and rolling on said first face of said individual sheet after separation, a counter element on one of said frame parts opposite to and cooperating with said roller element to clamp said individual sheet between said roller and counter elements so as to hold said individual sheet in said first frame part over a first predetermined portion of said relative movement of said frame parts, and spring means for urging said roller and counter elements toward one another.

2. A device for cyclic rearrangement of a pile of substantially planar rectangular sheets, said pile having a principal plane parallel to the plane of said sheets, comprising first and second frame parts movable relative to each other in a predetermined direction parallel to said principal plane, and including means for removal of an individual sheet from one end of the pile leaving a remainder of said pile and for adding said individual sheet to the other end of the remainder of the pile upon reciprocal relative movement of the frame parts, said individual sheet having a first substantially planar face in contact with said remainder of said pile prior to removal, said means comprising:

means for separating said individual sheet from the pile, means for feeding sheets to said separating means, retaining means for holding said individual sheet in said first frame part and the remainder of the pile in said second frame part, and means for guiding the individual sheet after separation for the purpose of returning it to the other end of the remainder of the pile, wherein said retaining means comprises:

a roller element rotatably journalled to said second frame part and rolling on said first face of said individual sheet after separation, a support member extending in said first frame part in said predetermined direction and adjacent to the face of said individual sheet which faces away from said roller, and means for urging said roller element and said support member toward one another to clamp said individual sheet between said roller element and said support member over a first predetermined portion of said relative movement of said frame parts.

3. A device for cyclic rearrangement of a pile of substantially planar rectangular sheets, said pile having a principal plane parallel to the plane of said sheets, comprising first and second frame parts movable relative to each other in a predetermined direction parallel to said principal plane, and including means for removal of an individual sheet from one end of the pile leaving a remainder of said pile and for adding said individual sheet to the other end of the remainder of the pile upon reciprocal relative movement of the frame parts, said individual sheet having a first substantially planar face in contact with said remainder of said pile prior to removal, said means comprising:

means for separating said individual sheet from the pile, means for feeding sheets to said separating means, retaining means for holding said individual sheet in said first frame part and the remainder of the pile in said second frame part, and means for guiding the individual sheet after separation for the purpose of returning it to the other end of the remainder of the pile, wherein said retaining means comprises:

a first roller element rotatably journalled to said second frame part and rolling on said first face of said individual sheet after separation, a second roller element rotatably journalled to said second frame part, said roller elements confronting each other to hold said individual sheet clamped therebetween after separation, and means for urging said first and second roller elements into frictional engagement with said individual sheet after separation, at least one of said roller elements being driven to rotate with a peripheral speed equal to the speed of said relative frame part movement.

4. A device as set forth in claim 1 including a pair of said retaining means.

5. A device as set forth in claim 4 wherein said retaining means are symmetrically disposed relative to a central plane of symmetry extending in said predetermined direction.

6. A device as set forth in claim 1 wherein at least one of said roller and counter elements is provided with a friction-increasing coating.

7. A device as set forth in claim 2 wherein said support member is provided with a friction-increasing coating.

8. A device as set forth in claim 3 wherein said driven roller element is provided with a friction-increasing coating.

9. A device as set forth in claim 8 wherein said support member extends over the entire stroke of said relative frame part movement.

10. A device as set forth in claim 9 wherein said first predetermined portion is substantially equal to said support member extension.

11. A device as set forth in claim 2 wherein said support member is distinct from and connected to said first frame part.

12. A device as set forth in claim 11 wherein said support member is fixed in said first frame part.

13. A device as set forth in claim 1 wherein said frame parts are spring-biased against one another to urge said roller and counter elements toward one another.

14. A device as set forth in claim 1 wherein one of said roller and counter elements is resiliently supported in the associated frame part.

15. A device as set forth in claim 14 wherein a spring is interposed between said roller element and said second frame part.

16. A device as set forth in claim 15 wherein said roller element is journalled in a carrier member and said spring is interposed between said carrier member and said second frame part.

17. A device as set forth in claim 2 including means for keeping said remainder of the pile spaced from said support member during relative movement of said frame parts.

18. A device as set forth in claim 17 wherein said means for keeping is on said second frame part.

19. A device as set forth in claim 17 wherein said means for keeping extends parallel to said predetermined direction and parallel to said support member.

20. A device as set forth in claim 17 wherein said means for keeping is disposed laterally with respect to said support member.

21. A device as set forth in claim 1 wherein said first frame part is a housing having a substantially planar viewing window and said second frame part is a slider reciprocable relative to said housing parallel to the plane defined by said window.

22. A device as set forth in claim 21 wherein said slider is reciprocable between a start/stop position in the housing and a withdrawn position.

23. A device as set forth in claim 22 wherein said individual sheet is the one remote from said window when said slider is in its start/stop position.

24. A device as set forth in claim 21 wherein said slider includes a separator bar extending transverse to said predetermined direction, said bar retaining said remainder of the pile.

25. A device as set forth in claim 24 wherein said separator bar has an edge transverse to said predetermined direction for cooperating with said first frame part to define an entry slot for a transverse end border of said individual sheet, said transverse end border extending parallel to said separator bar edge.

26. A device as set forth in claim 25 including spacing means cooperating with said first and second frame parts to define the dimension of said entry slot perpendicular to said principal plane.

27. A device as set forth in claim 26 wherein said separator bar edge and said first frame part are spring-biased toward one another.

28. A device as set forth in claim 25 wherein said separator bar edge is provided at a shoe displaceably mounted in said separator bar.

29. A device as set forth in claim 28 wherein said roller element is journalled in said shoe.

30. A device as set forth in claim 26 wherein all of said sheets have substantially equal predetermined thickness, and wherein said slot dimension is greater than said thickness and less than twice said thickness.

31. A device as set forth in claim 30 wherein all of said sheets have substantially equal predetermined thickness, and wherein said roller element projects beyond said separator bar edge by less than the thickness of one sheet.

32. A device as set forth in claim 24 wherein said separator bar has surface portions defining, with a plane parallel to said window, an acute angle, said surface portions facing end borders of sheets in said remainder of the pile.

33. A device as set forth in claim 25 wherein said separator bar has surface portions defining, with a plane parallel to said window, an acute angle, said surface portions facing end borders of sheets in said remainder of the pile, and wherein said separator bar edge is provided adjacent one end of said surface portions.

34. A device as set forth in claim 28 wherein a shoe bias spring is integrated between said shoe and said separator bar.

35. A device as set forth in claim 1 including additional retaining means to hold said individual sheet in said first frame part over a second predetermined portion of said relative frame part movement.

36. A device as set forth in claim 35 wherein said additional retaining means includes at least one hook member in said first frame part.

37. A device as set forth in claim 35 wherein said additional retaining means includes at least one clamping spring in said first frame part.

38. A device as set forth in claim 35 wherein said additional retaining means includes at least one stop member in said first frame part.

39. A device as set forth in claim 35 comprising a pair of said additional retaining means disposed symmetrically relative to a central plane of symmetry extending in said predetermined direction.

40. A device as set forth in claim 35 wherein said first and second predetermined portions partly overlap one another.

41. A device as set forth in claim 40 wherein said predetermined portions overlap one another during an initial phase of said relative frame part movement.

42. A device as set forth in claim 40 wherein said predetermined portions overlap one another adjacent a direction reversal phase of said relative frame part movement.

43. A device as set forth in claim 1 wherein said roller element is driven to rotate with a peripheral speed equal to the speed of said relative frame part movement.

44. A device as set forth in claim 43 including a toothed rack in said first frame part meshing with a pinion gear which is drivingly coupled to said roller element.

45. A device as set forth in claim 44 wherein said driven roller element has a friction-increasing coating.

46. A device as set forth in claim 28 wherein said shoe is pivotally mounted about an axis parallel to said predetermined direction to accommodate sheet deformations.

47. A device as set forth in claim 24 wherein said separator bar is spring-biased by said spring means.

48. A device as set forth in claim 8 wherein said first and second roller elements have a friction-increasing coating.

49. A device as set forth in claim 2 wherein said support member is symmetrical with respect to a plane extending orthogonal relative to said predetermined direction.

50. A device as set forth in claim 26 wherein said spacing means are integrally formed with said support member.

* * * * *

UNITED STATES PATENT AND TRADEMARK OFFICE
CERTIFICATE OF CORRECTION

PATENT NO. : 4,777,748

DATED : October 18, 1988

INVENTOR(S) : Peter Ackeret

It is certified that error appears in the above-identified patent and that said Letters Patent is hereby corrected as shown below:

| Column | Line | |
|--------|------|---|
| 20 | 49 | Change "8" to --7--. |

Signed and Sealed this

Ninth Day of July, 1991

Attest:

HARRY F. MANBECK, JR.

Attesting Officer

Commissioner of Patents and Trademarks